US011887531B2

(12) United States Patent
Kim et al.

(10) Patent No.: US 11,887,531 B2
(45) Date of Patent: Jan. 30, 2024

(54) DISPLAY DEVICE

(71) Applicant: Samsung Display Co., Ltd., Yongin-si (KR)

(72) Inventors: Jinpil Kim, Suwon-si (KR); Kanghee Lee, Yongin-si (KR); Joon-Chul Goh, Suwon-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 17/943,624

(22) Filed: Sep. 13, 2022

(65) Prior Publication Data

US 2023/0078888 A1 Mar. 16, 2023

(30) Foreign Application Priority Data

Sep. 16, 2021 (KR) ........................ 10-2021-0123616

(51) Int. Cl.
*G09G 3/32* (2016.01)
*G09G 3/3233* (2016.01)

(52) U.S. Cl.
CPC ............. *G09G 3/32* (2013.01); *G09G 3/3233* (2013.01); *G09G 2320/0233* (2013.01); (Continued)

(58) Field of Classification Search
CPC ............. G09G 3/32; G09G 2320/0233; G09G 2320/0257; G09G 2320/103; (Continued)

(56) References Cited

U.S. PATENT DOCUMENTS 6,626,717 B2 * 9/2003 Miyashita .............. H10K 71/00 445/6
7,265,736 B2 * 9/2007 Lee ...................... G09G 3/2059 345/60

(Continued)

FOREIGN PATENT DOCUMENTS

JP 2002203672 A 7/2002
KR 101965674 B1 4/2019

OTHER PUBLICATIONS

Oodate, et al., IEEE, Compact Modeling of Carrier Trapping for Accurate Prediction of Frequency Dependent Circuit Operation, 4 Pages, May 11, 2021.

(Continued)

*Primary Examiner* — Michael J Jansen, II
(74) *Attorney, Agent, or Firm* — CANTOR COLBURN LLP

(57) ABSTRACT

A display device includes: a display panel, which displays an image; a panel driver, which drives the display panel; and a driving controller, which controls a drive of the panel driver. The driving controller includes a compensation determination block and a data compensation block. The compensation determination block is activated after a still image is displayed for a predetermined time or more and generates a compensation value based on a final afterimage component calculated using an afterimage algorithm obtained by a combination of a first afterimage calculation equation and a second afterimage calculation equation. The data compensation block receives an image signal with respect to a target image and reflects the compensation value to the image signal to generate a compensation image signal.

17 Claims, 22 Drawing Sheets

(52) U.S. Cl.
CPC ............... *G09G 2320/0257* (2013.01); *G09G 2320/046* (2013.01); *G09G 2320/103* (2013.01)

(58) Field of Classification Search
CPC ............. G09G 2340/16; G09G 3/3291; G09G 2360/16; G09G 3/3233; G09G 2320/046
See application file for complete search history.

(56) References Cited

U.S. PATENT DOCUMENTS 8,289,304 B2 * 10/2012 Chiou ...................... G09G 3/36
345/207
8,872,836 B2 * 10/2014 Rabii ..................... G09G 5/393
345/530
9,997,098 B2 * 6/2018 Byun ................... G09G 3/3275
10,573,266 B2 * 2/2020 Tseng ................... G09G 3/3611
11,011,136 B2 * 5/2021 Takiguchi ............ G09G 3/3208
11,250,757 B2 * 2/2022 Nam ........................ G09G 3/20
11,521,576 B2 * 12/2022 Matsumoto .......... G09G 3/2003
11,626,053 B2 * 4/2023 Nam .................... G09G 3/3696
345/212
2002/0123291 A1 * 9/2002 Miyashita ............. H10K 71/00
445/6
2004/0070590 A1 * 4/2004 Lee ...................... G09G 3/2022
345/690
2006/0044472 A1 * 3/2006 Lee .......................... G09G 3/20
348/E5.065
2008/0001881 A1 * 1/2008 Baba .................... G09G 3/3406
345/89
2010/0214275 A1 * 8/2010 Chiou ...................... G09G 3/36
345/207
2012/0188262 A1 * 7/2012 Rabii ..................... G09G 5/393
345/534
2017/0061852 A1 * 3/2017 Byun .................. G09G 3/2055
2019/0051261 A1 * 2/2019 Tseng ................... G09G 3/3611
2020/0135143 A1 * 4/2020 Takiguchi ............ G09G 3/2018
2021/0225326 A1 * 7/2021 Matsumoto .......... G09G 3/3233
2021/0272493 A1 * 9/2021 Nam ........................ G09G 3/20
2022/0165196 A1 * 5/2022 Nam .................... G09G 3/3696
2023/0078888 A1 * 3/2023 Kim ..................... G09G 3/3291
345/690

OTHER PUBLICATIONS

Rountree, et al., Round 2 Update of Stress Testing Results for Organic Light-Emitting Diode Panels and Luminaires, 51 Pages, Dec. 2018.

* cited by examiner

DISPLAY DEVICE

This application claims priority to Korean Patent Application No. 10-2021-0123616, filed on Sep. 16, 2021, and all the benefits accruing therefrom under 35 U.S.C. § 119, the content of which in its entirety is herein incorporated by reference.

BACKGROUND

1. Field of Disclosure

The present disclosure relates to a display device. More particularly, the present disclosure relates to a display device capable of improving an afterimage.

2. Description of the Related Art

Among display devices, a light emitting type display device displays an image using a light emitting diode that emits a light by a recombination of holes and electrons. The light emitting type display device has advantages such as a fast response speed, a low power consumption, etc.

The display device includes a display panel for displaying an image, a scan driver sequentially for applying scan signals to scan lines arranged in the display panel, and a data driver for applying data signals to data lines arranged in the display panel.

SUMMARY

The present disclosure provides a display device capable of improving an afterimage.

Embodiments of the invention provide a display device including a display panel displaying an image, a panel driver driving the display panel, and a driving controller controlling a drive of the panel driver.

The driving controller includes a compensation determination block and a data compensation block. The compensation determination block is activated after a still image is displayed for a predetermined time or more and generates a compensation value based on a final afterimage component calculated using an afterimage algorithm obtained by a combination of a first afterimage calculation equation and a second afterimage calculation equation. The data compensation block receives an image signal and reflects the compensation value to the image signal to generate a compensation image signal.

The compensation determination block generates the first and second afterimage calculation equations by reflecting a difference in grayscale between the still image and a target image and a time during which the still image is displayed. The target image corresponds to an original image of the image signal without an afterimage.

Embodiments of the invention provide a display device including a display panel, a panel driver, and a driving controller. The display panel includes a first display area and a second display area, displays a first image through the first and second display areas in a first mode, and displays a second image through the first display area in a second mode. The panel driver drives the display panel in the first mode or the second mode, and the driving controller controls a drive of the panel driver.

The driving controller includes a compensation determination block and a data compensation block. The compensation determination block is activated after the second mode is switched to the first mode and generates a compensation value based on a final afterimage component calculated using an afterimage algorithm obtained by a combination of a first afterimage calculation equation and a second afterimage calculation equation. The data compensation block receives a second image signal corresponding to the second display area and reflects the compensation value to the second image signal to generate a second compensation image signal.

According to the above, as the compensation value is generated based on the final afterimage component calculated using the afterimage algorithm and the image signal is compensated for based on the compensation value, the medium-term afterimage is removed within a period during which the medium-term afterimage occurs. Accordingly, a deterioration of a display quality, which is caused by the medium-term afterimage, is effectively prevented in the display device.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
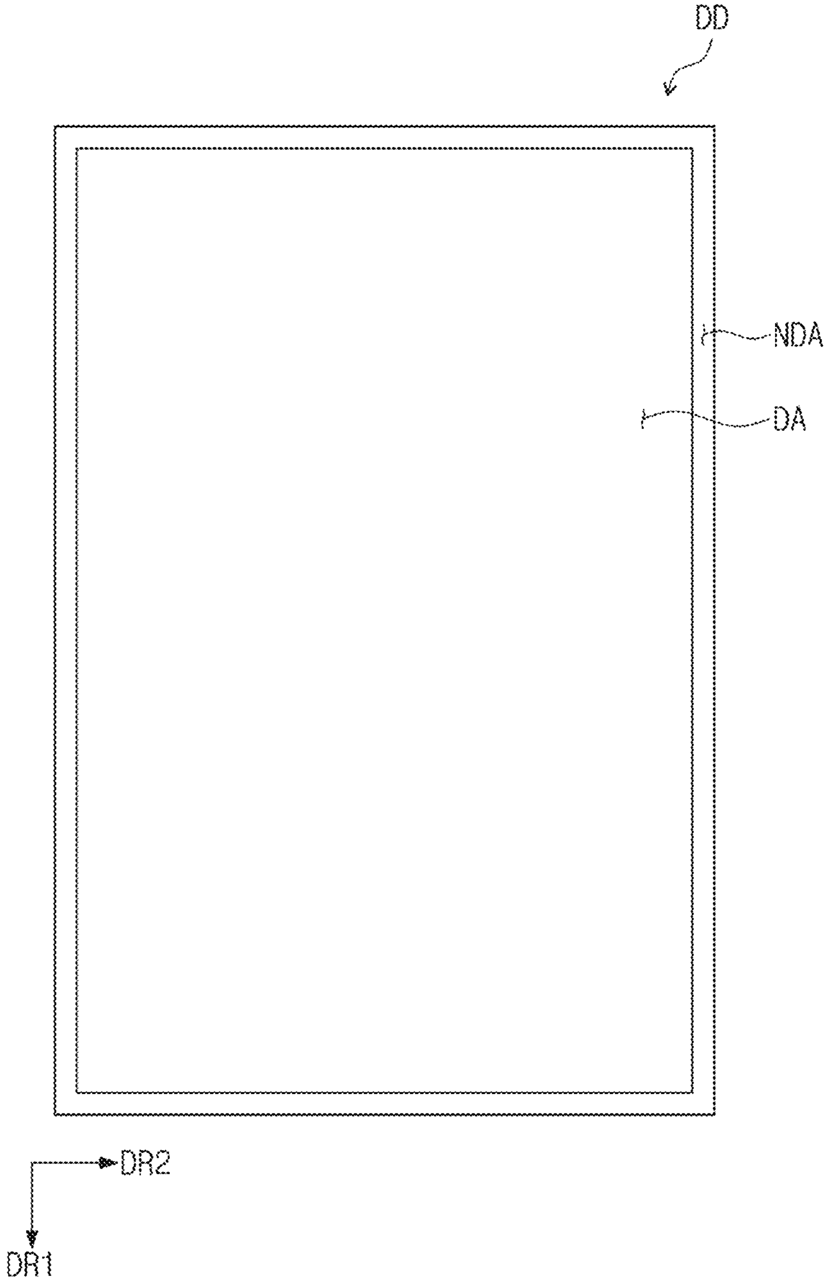
FIG. 1 is a plan view of a display device according to an embodiment of the present disclosure.

In the present disclosure, it will be understood that when an element or layer is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content. As used herein, the term "and/or" may include any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About", "approximately", "substantially equal" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present disclosure will be explained in detail with reference to the accompanying drawings.

FIG. 1 is a plan view of a display device DD according to an embodiment of the present disclosure.

Referring to FIG. 1, the display device DD may be a device activated in response to electrical signals. The display device DD may be applied to electronic items, such as a smartphone, a smart watch, a tablet computer, a notebook computer, a computer, a smart television, etc.

The display device DD may include a display surface substantially parallel to each of a first direction DR1 and a second direction DR2 and may display an image through the display surface. The display surface may correspond to a front surface of the display device DD.

The display surface of the display device DD may include a display area DA and a non-display area NDA. The display area DA may be an area in which the image is displayed. A user may view the image through the display area DA. In the present embodiment, the display area DA has a quadrangular shape, however, this is merely one example. According to an embodiment, the display area DA may have a variety of shapes and should not be particularly limited.

The non-display area NDA may be defined adjacent to the display area DA. The non-display area NDA may have a predetermined color. The non-display area NDA may surround the display area DA. Accordingly, the shape of the display area DA may be defined by the non-display area NDA, however, this is merely one example. According to an embodiment, the non-display area NDA may be disposed adjacent to only one side of the display area DA or may be omitted. The display device DD may include various embodiments and should not be particularly limited.

Figure 2:
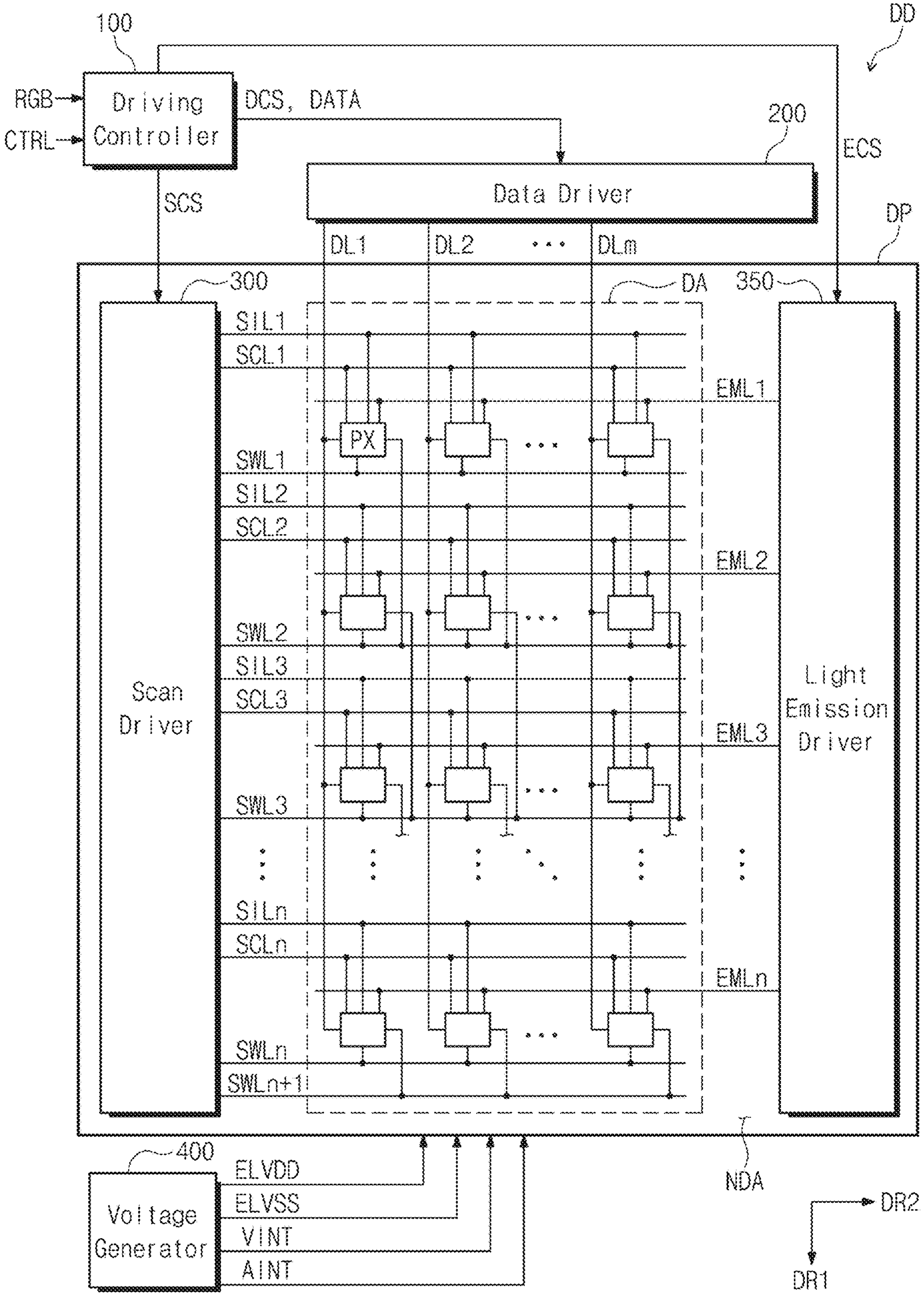
FIG. 2 is a block diagram of a display device according to an embodiment of the present disclosure.
Figure 3:
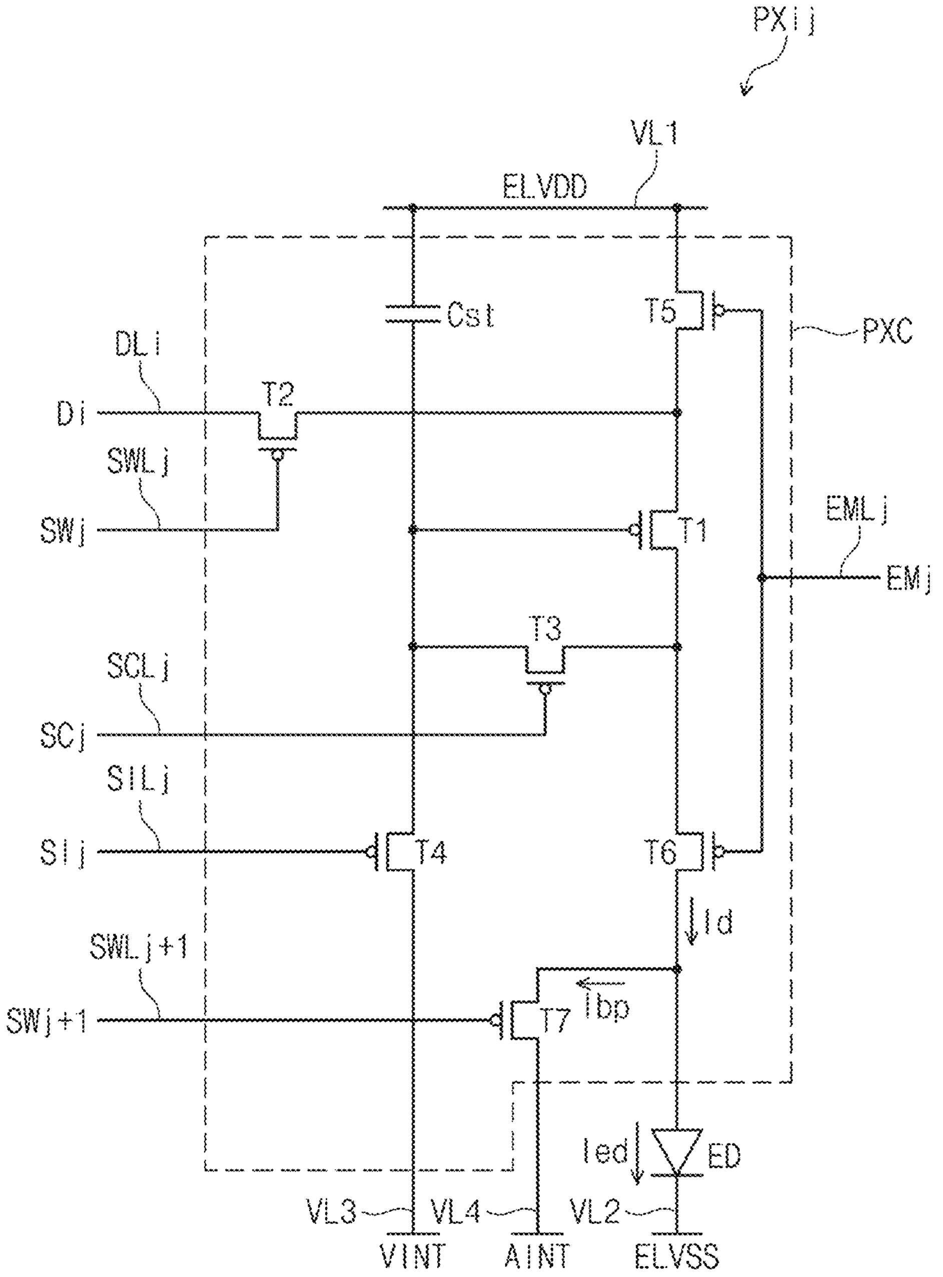
FIG. 3 is a circuit diagram of a pixel according to an embodiment of the present disclosure.
Figure 4:
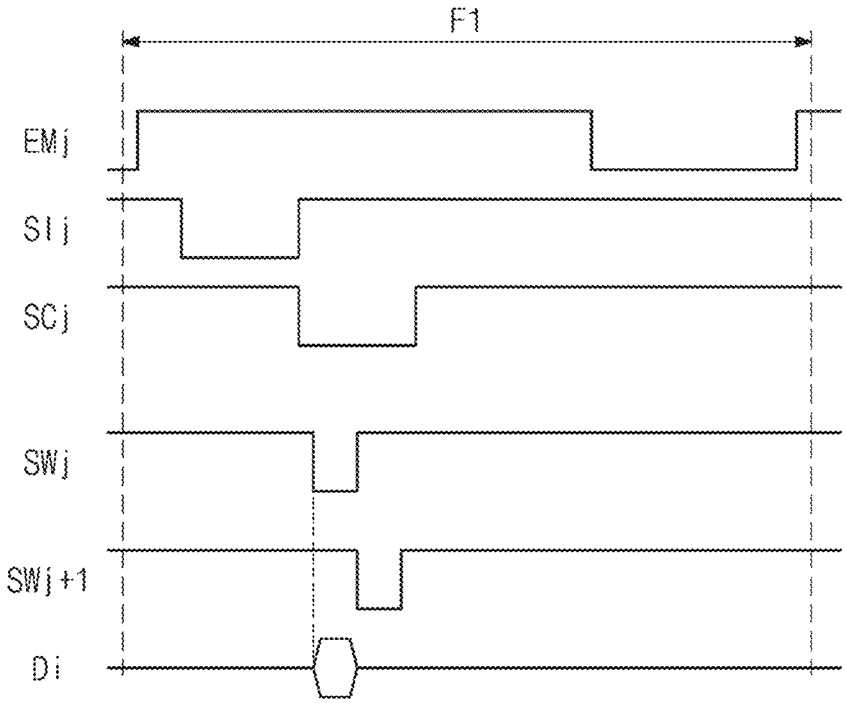
FIG. 4 is a timing diagram explaining an operation of the pixel shown in FIG. 3.

FIG. 2 is a block diagram of the display device DD according to an embodiment of the present disclosure, FIG. 3 is a circuit diagram of a pixel PXij according to an embodiment of the present disclosure, and FIG. 4 is a timing diagram explaining an operation of the pixel PXij shown in FIG. 3.

Referring to FIGS. 2 and 3, the display device DD may include a display panel DP, a panel driver driving the display panel DP, and a driving controller 100 controlling an operation of the panel driver. As an example, the panel driver may include a data driver 200, a scan driver 300, a light emission driver 350, and a voltage generator 400.

The driving controller 100 may receive input image signal RGB and control signals CTRL. The driving controller 100 may convert a data format of the input image signal RGB to a data format appropriate to an interface between the data driver 200 and the driving controller 100 to generate image data DATA. The driving controller 100 may generate a first driving control signal SCS, a second driving control signal DCS, and a third driving control signal ECS based on the control signals CTRL.

The data driver 200 may receive the second driving control signal DCS and the image data DATA from the driving controller 100. The data driver 200 may convert the image data DATA to data signals and may output the data signals to a plurality of data lines DL1 to DLm described later. The data signals may be analog voltages corresponding to grayscale values of the image data DATA.

The scan driver 300 may receive the first driving control signal SCS from the driving controller 100. The scan driver 300 may output scan signals to scan lines in response to the first driving control signal SCS.

The voltage generator 400 may generate voltages required to operate the display panel DP. In the present embodiment, the voltage generator 400 may generate a first driving voltage ELVDD, a second driving voltage ELVSS, a first initialization voltage VINT, and a second initialization voltage AINT.

The display panel DP may include initialization scan lines SIL1 to SILn, compensation scan lines SCL1 to SCLn, write scan lines SWL1 to SWLn+1, light emission control lines EML1 to EMLn, the data lines DL1 to DLm, and pixels PX. The initialization scan lines SIL1 to SILn, the compensation scan lines SCL1 to SCLn, the write scan lines SWL1 to SWLn+1, the light emission control lines EML1 to EMLn, the data lines DL1 to DLm, and the pixels PX may overlap the display area DA. The initialization scan lines SIL1 to SILn, the compensation scan lines SCL1 to SCLn, the write scan lines SWL1 to SWLn+1, and the light emission control lines EML1 to EMLn may extend in the second direction DR2. The initialization scan lines SIL1 to SILn, the compensation scan lines SCL1 to SCLn, the write scan lines SWL1 to SWLn+1, and the light emission control lines EML1 to EMLn may be arranged in the first direction DR1 and may be spaced apart from each other. The data lines DL1 to DLm may extend in the first direction DR1 and may be arranged spaced apart from each other in the second direction DR2.

The pixels PX may be electrically connected to the initialization scan lines SIL1 to SILn, the compensation scan lines SCL1 to SCLn, the write scan lines SWL1 to SWLn+1, the light emission control lines EML1 to EMLn, and the data lines DL1 to DLm. Each of the pixels PX may be electrically connected to four scan lines. As an example, as shown in FIG. 2, pixels arranged in a first row may be connected to a first initialization scan line SIL1, a first compensation scan line SCL1, and first and second write scan lines SWL1 and SWL2. In addition, pixels arranged in a second row may be connected to a second initialization scan line SIL2, a second compensation scan line SCL2, and the second write scan line SWL2 and a third write scan line SWL3.

The scan driver 300 may be disposed in the non-display area NDA of the display panel DP. The scan driver 300 may receive the first driving control signal SCS from the driving controller 100. Responsive to the first driving control signal SCS, the scan driver 300 may output initialization scan signals to the initialization scan lines SIL1 to SILn, may output compensation scan signals to the compensation scan lines SCL1 to SCLn, and may output write scan signals to the write scan lines SWL1 to SWLn+1. A circuit configuration and an operation of the scan driver 300 will be described in detail later.

The light emission driver 350 may receive the third driving control signal ECS from the driving controller 100. The light emission driver 350 may output light emission control signals to the light emission control lines EML1 to EMLn in response to the third driving control signal ECS. According to an embodiment, the scan driver 300 may be connected to the light emission control lines EML1 to EMLn. In this case, the scan driver 300 may output the light emission control signals to the light emission control lines EML1 to EMLn.

Each of the pixels PX may include a light emitting diode ED and a pixel circuit part PXC that controls a light emission of the light emitting diode ED. The pixel circuit part PXC may include a plurality of transistors and a capacitor. The scan driver 300 and the light emission driver 350 may include transistors that are formed through the same processes as those of the pixel circuit part PXC.

Each of the pixels PX may receive the first driving voltage ELVDD, the second driving voltage ELVSS, the first initialization voltage VINT, and the second initialization voltage AINT from the voltage generator 400.

FIG. 3 shows an equivalent circuit diagram of one pixel PXij among the pixels shown in FIG. 2. The pixels may have the same circuit configuration, and thus, the circuit configuration of the pixel PXij will be described in detail, and details of other pixels will be omitted. The pixel PXij may be connected to an i-th data line DLi (hereinafter, referred to as a "data line") among the data lines DL1 to DLm, a j-th initialization scan line SILj (hereinafter, referred to as an "initialization scan line") among the initialization scan lines SIL1 to SILn, a j-th compensation scan line SCLj (hereinafter, referred to as a "compensation scan line") among the compensation scan lines SCL1 to SCLn, j-th and (j+1)th write scan lines SWLj and SWLj+1 (hereinafter, referred to as first and second write scan lines) among the write scan lines SWL1 to SWLn, and a j-th light emission control line EMLj (hereinafter, referred to as a "light emission control line") among the light emission control lines EML1 to EMLn.

The pixel PXij may include the light emitting diode ED and the pixel circuit part PXC. The pixel circuit part PXC may include first, second, third, fourth, fifth, sixth, and seventh transistors T1, T2, T3, T4, T5, T6, and T7 and one capacitor Cst. Each of the first to seventh transistors T1 to T7 may be a transistor including a low-temperature polycrystalline silicon ("LTPS") semiconductor layer. All the first to seventh transistors T1 to T7 may be a P-type transistor, however, the present disclosure should not be limited thereto or thereby. As an example, all the first to seventh transistors T1 to T7 may be an N-type transistor. According to an embodiment, some transistors of the first to seventh transistors T1 to T7 may be the P-type transistor, and the other transistors may be the N-type transistor. As an example, each of the first, second, fifth, sixth, and seventh transistors T1, T2, T5, T6, and T7 among the first to seventh transistors T1 to T7 may be the P-type transistor, and each of the third and fourth transistors T3 and T4 may be the N-type transistor including an oxide semiconductor as its semiconductor layer. However, the configuration of the pixel circuit part PXC should not be limited to the embodiment shown in FIG. 3. The pixel circuit part PXC shown in FIG. 3 is merely one example, and the configuration of the pixel circuit part PXC may be changed. As an example, all the first to seventh transistors T1 to T7 may be the P-type transistor or the N-type transistor.

The initialization scan line SILj, the compensation scan line SCLj, the first and second write scan lines SWLj and SWLj+1, and the light emission control line EMLj may transmit a j-th initialization scan signal SIj (hereinafter, referred to as an "initialization scan signal"), a j-th compensation scan signal SCj (hereinafter, referred to as a "compensation scan signal"), j-th and (j+1)th write scan signals SWj and SWj+1 (hereinafter, referred to as "first and second write scan signals"), and a j-th light emission control signal EMj (hereinafter, referred to as a "light emission control signal") to the pixel PXij, respectively. The data line DLi may transmit a data signal Di to the pixel PXij. The data signal Di may have a voltage level corresponding to a grayscale of a corresponding image signal among the image signal RGB input to the display device DD (refer to FIG. 2). First, second, third, and fourth driving voltage lines VL1, VL2, VL3, and VL4 may transmit the first driving voltage ELVDD, the second driving voltage ELVSS, the first initialization voltage VINT, and the second initialization voltage AINT to the pixel PXij, respectively.

The first transistor T1 may include a first electrode connected to the first driving voltage line VL1 via the fifth transistor T5, a second electrode electrically connected to an anode of the light emitting diode ED via the sixth transistor T6, and a gate electrode connected to one end of the capacitor Cst. The first transistor T1 may receive the data signal Di transmitted via the data line DLi according to a switching operation of the second transistor T2 and may supply a driving current Id to the light emitting diode ED.

The second transistor T2 may include a first electrode connected to the data line DLi, a second electrode connected to the first electrode of the first transistor T1, and a gate electrode connected to the first write scan line SWLj. The second transistor T2 may be turned on in response to the first write scan signal SWj applied thereto via the first write scan line SWLj and may transmit the data signal Di applied thereto via the data line DLi to the first electrode of the first transistor T1.

The third transistor T3 may include a first electrode connected to the second electrode of the first transistor T1, a second electrode connected to the gate electrode of the first transistor T1, and a gate electrode connected to the compensation scan line SCLj. The third transistor T3 may be turned on in response to the compensation scan signal SCj applied thereto via the compensation scan line SCLj and may connect the gate electrode and the second electrode of the first transistor T1 to each other to allow the first transistor T1 to be connected in a diode configuration.

The fourth transistor T4 may include a first electrode connected to the gate electrode of the first transistor T1, a second electrode connected to the third driving voltage line VL3 to which the first initialization voltage VINT is transmitted, and a gate electrode connected to the initialization scan line SILj. The fourth transistor T4 may be turned on in response to the initialization scan signal SIj applied thereto via the initialization scan line SILj and may transmit the first initialization voltage VINT to the gate electrode of the first transistor T1 to perform an initialization operation that initializes a voltage of the gate electrode of the first transistor T1.

The fifth transistor T5 may include a first electrode connected to the first driving voltage line VL1, a second electrode connected to the first electrode of the first transistor T1, and a gate electrode connected to the light emission control line EMLj.

The sixth transistor T6 may include a first electrode connected to the second electrode of the first transistor T1, a second electrode connected to the anode of the light emitting diode ED, and a gate electrode connected to the light emission control line EMLj.

The fifth transistor T5 and the sixth transistor T6 may be substantially simultaneously turned on in response to the light emission control signal EMj applied thereto via the light emission control line EMLj. The first driving voltage ELVDD applied via the turned-on fifth transistor T5 may be compensated for by the first transistor T1 connected in the diode configuration and may be transmitted to the light emitting diode ED.

The seventh transistor T7 may include a first electrode connected to the second electrode of the sixth transistor T6, a second electrode connected to the fourth driving voltage line VL4 to which the second initialization voltage AINT is transmitted, and a gate electrode connected to the second write scan line SWLj+1.

As described above, the one end of the capacitor Cst may be connected to the gate electrode of the first transistor T1, and the other end of the capacitor Cst may be connected to the first driving voltage line VL1. A cathode of the light emitting diode ED may be connected to the second driving voltage line VL2 that transmits the second driving voltage ELVSS.

Referring to FIGS. 3 and 4, when the initialization scan signal SIj at low level is provided via the initialization scan line SILj during an initialization period of one frame F1, the fourth transistor T4 may be turned on in response to the initialization scan signal SIj at the low level. The first initialization voltage VINT may be applied to the gate electrode of the first transistor T1 via the turned-on fourth transistor T4, and the gate electrode of the first transistor T1 may be initialized by the first initialization voltage VINT.

Then, when the compensation scan signal SCj at low level is provided via the compensation scan line SCLj during a compensation period of the one frame F1, the third transistor T3 may be turned on. The compensation period may not overlap the initialization period. An activation period of the compensation scan signal SCj may be defined as a period in which the compensation scan signal SCj has the low level, and an activation period of the initialization scan signal SIj may be defined as a period in which the initialization scan signal SIj has the low level. The activation period of the compensation scan signal SCj may not overlap the activation period of the initialization scan signal SIj. The activation period of the initialization scan signal SIj may precede the activation period of the compensation scan signal SCj.

During the compensation period, the first transistor T1 may be connected in a diode configuration and may be forward biased by the turned-on third transistor T3. In addition, the compensation period may include a data write period in which the first write scan signal SWj is generated at low level. The second transistor T2 may be turned on in response to the first write scan signal SWj at low level during the data write period. Then, a compensation voltage Di-Vth reduced by a threshold voltage Vth of the first transistor T1 from the data signal Di provided via the data line DLi may be applied to the gate electrode of the first transistor T1. That is, an electric potential of the gate electrode of the first transistor T1 may be the compensation voltage Di-Vth.

The first driving voltage ELVDD and the compensation voltage Di-Vth may be applied to both ends (or opposite ends) of the capacitor Cst, respectively, and the capacitor Cst may be charged with electric charges corresponding to a difference in voltage between the both ends of the capacitor Cst.

Meanwhile, the seventh transistor T7 is turned on in response to the second write scan signal SWj+1 having the low level applied thereto via the second write scan line SWLj+1. A portion of the driving current Id may be bypassed as a bypass current Ibp via the seventh transistor T7.

In a case where the pixel PXij displays a black image, when the light emitting diode ED emits a light even though a minimum current of the first transistor T1 flows as the driving current Id, the pixel PXij may not properly display the black image. Therefore, the seventh transistor T7 of the pixel PXij according to the embodiment of the present disclosure may distribute a portion of the minimum current of the first transistor T1 to another current path as a bypass current Ibp rather than to a current path to the light emitting diode ED. In this case, the minimum current of the first transistor T1 means a current flowing to the first transistor T1 under a condition that a gate-source voltage Vgs of the first transistor T1 is less than the threshold voltage Vth and the first transistor T1 is turned off. In this way, when the minimum driving current that turns off the first transistor T1, for example, a current of less than about 10 picoamperes (pA), is transmitted to the light emitting diode ED, an image with a black grayscale may be displayed. In the case where the pixel PXij displays the black image, an influence of bypass transmission of the bypass current Ibp is relatively large, however, in the case where images, such as a normal image or a white image, are displayed, the influence of the bypass current Ibp with respect to the driving current Id may be negligible. Accordingly, when the black image is displayed, a current, i.e., a light emitting current Ied, reduced by an amount of the bypass current Ibp, which is bypassed through the seventh transistor T7, from the driving current Id may be provided to the light emitting diode ED, and thus, the black image may be clearly displayed. Thus, the pixel PXij may display an accurate black grayscale image using the seventh transistor T7, and as a result, a contrast ratio may be improved.

Then, a level of the light emission control signal EMj provided from the light emission control line EMLj may be changed to a low level from a high level. The fifth transistor T5 and the sixth transistor T6 may be turned on in response to the light emission signal EMj having the low level. As a result, the driving current Id may be generated due to a difference in voltage between the gate voltage of the gate electrode of the first transistor T1 and the first driving voltage ELVDD, the driving current Id may be supplied to the light emitting diode ED via the sixth transistor T6, and thus, the light emitting current led may flow through the light emitting diode ED.

Figure 5A:
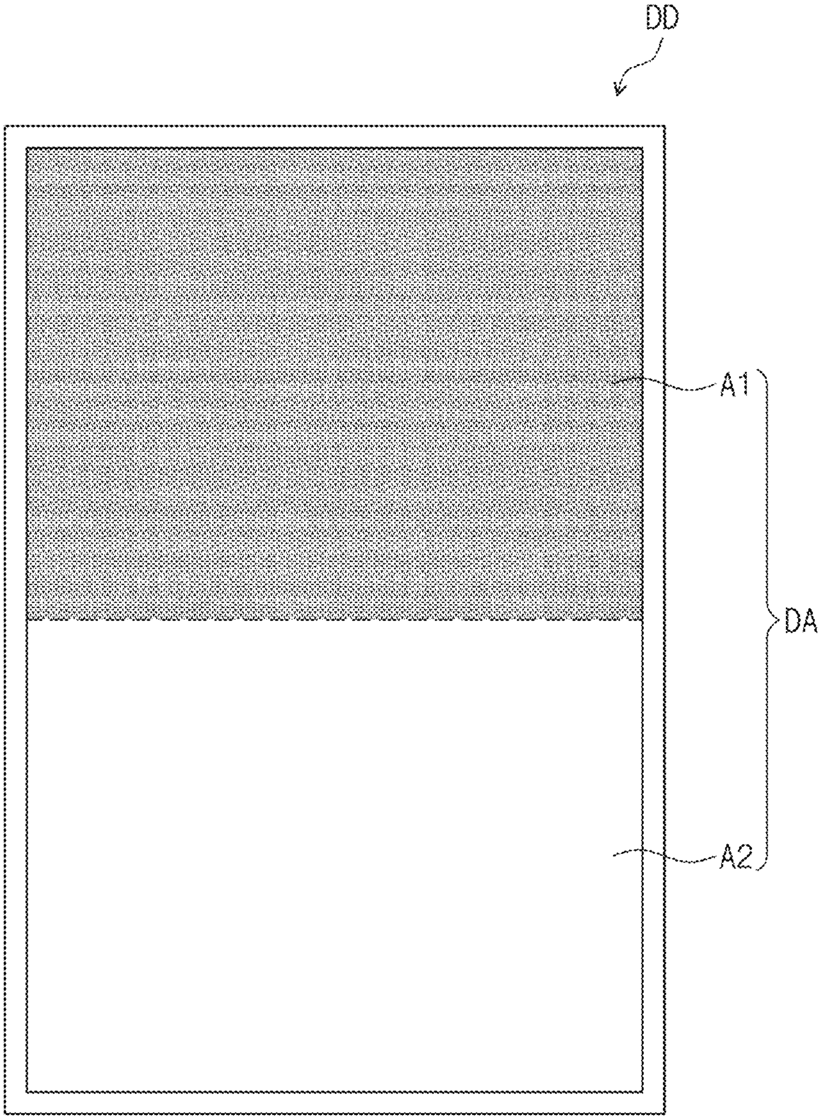
FIG. 5A is a plan view of a screen in which a still image is displayed.
Figure 5B:
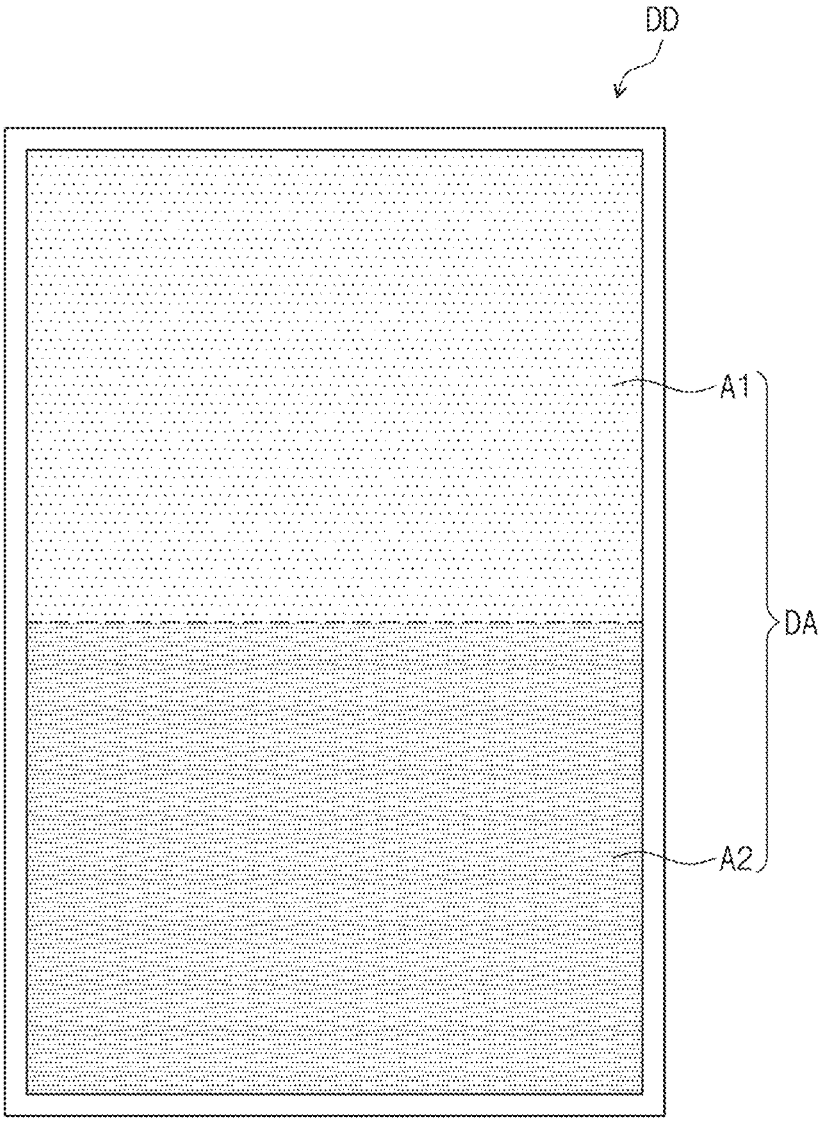
FIG. 5B is a plan view of a screen in which an medium-term afterimage is displayed.
Figure 5C:
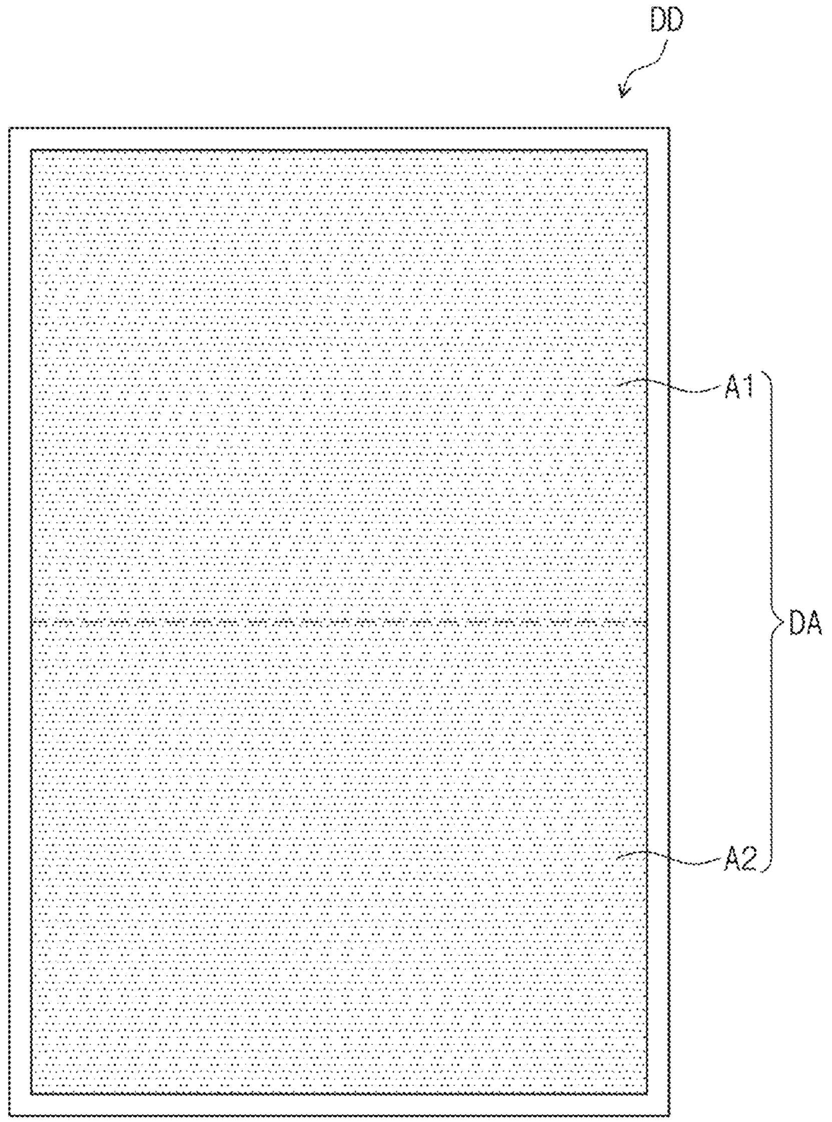
FIG. 5C is a plan view of a screen from which an medium-term afterimage is removed.

FIG. 5A is a plan view of a screen in which a still image is displayed, FIG. 5B is a plan view of a screen in which an medium-term afterimage occurs, and FIG. 5C is a plan view of a screen from which an medium-term afterimage is removed.

Referring to FIGS. 5A to 5C, a still image may be displayed in the display area DA of the display device DD. As an example, the display area DA may include a first area A1 and a second area A2. The still image having a black grayscale or a first low grayscale may be displayed in the first area A1, and the still image having a white grayscale or a high grayscale may be displayed in the second area A2. That is, the still image may include a first still image displayed in the first area A1 and a second still image displayed in the second area A2. However, this is merely one example to explain the medium-term afterimage, and the still image according to the invention should not be particularly limited.

In a case where the still image is displayed over a predetermined time and switched to another image, the medium-term afterimage may occur for a certain period of time. As an example, the predetermined time may be about 10 seconds or more and may be about 1 hour or less. In a case where the display of the still image ends and an image (hereinafter, referred to as a "target image") having a target grayscale is displayed over the display area DA, the medium-term afterimage may occur in the first and second areas A1 and A2 for the certain period of time as shown in FIG. 5B. In the present embodiment, the target image may be an image (hereinafter, referred to as an "afterimage-causing image") that lasts for a few seconds to a few minutes. In a case where the target image is a video, the medium-term afterimage may not occur. In the example of FIG. 5B, a uniform image (e.g., 48 grayscale) is used as the afterimage-causing image.

In the case where the target image is the afterimage-causing image, a difference in luminance between the first and second areas A1 and A2 may be visible due to the medium-term afterimage for the certain period of time. After the certain period of time elapses, the target image from which the medium-term afterimage is removed may be displayed in the display area DA as shown in FIG. 5C. The driving controller 100 (refer to FIG. 2) may compensate for the image signal such that the user may not view the medium-term afterimage occurring for the certain period of time.

The medium-term afterimage may occur in different ways depending on the grayscale of the still image, the grayscale of the target image, and the display time. As an example, when the first still image having the first low grayscale (e.g., 8 grayscale) are displayed in the first area A1 for about 10 seconds and then a target data signal having the target grayscale (e.g., 48 grayscale) higher than the first low grayscale is provided to the pixel PX (refer to FIG. 2) of the first area A1, an image (hereinafter, referred to as a "first afterimage") having a grayscale higher than the target grayscale may be viewed in the first area A1 for the certain period of time.

Meanwhile, when the second still image having the white grayscale is displayed in the second area A2 for about 10 seconds and then the target data signal having the target grayscale (e.g., 48 grayscale) lower than the white grayscale (e.g., 128 grayscale) is provided to the pixel PX of the second area A2, an image (hereinafter, referred to as a "second afterimage") having a grayscale lower than the target grayscale may be visible in the second area A2 for the certain period of time.

As an example, the medium-term afterimage may be caused by a change in hysteresis characteristics of the transistors T1 to T7 (refer to FIG. 3) provided in each pixel PX.

Due to the medium-term afterimage, although the same target image is supposed to be displayed in the first and second areas A1 and A2, the first afterimage and the second afterimage may be displayed in the first area A1 and the second area A2, respectively, for the certain period of time. The difference in luminance between the first and second afterimages may be visible in the display area DA by the medium-term afterimage for the certain period of time.

Figure 6A:
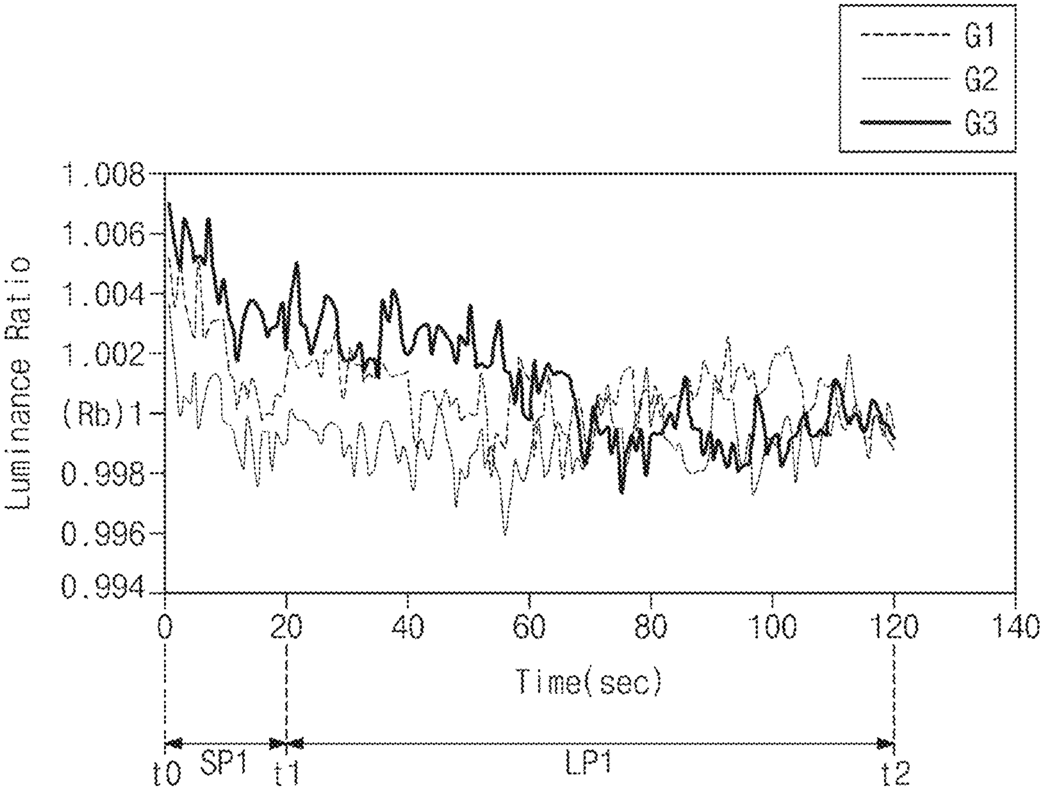
FIG. 6A is a graph showing an medium-term afterimage displayed in a first area of FIG. 5B as a function of a display time of a still image.
Figure 6B:
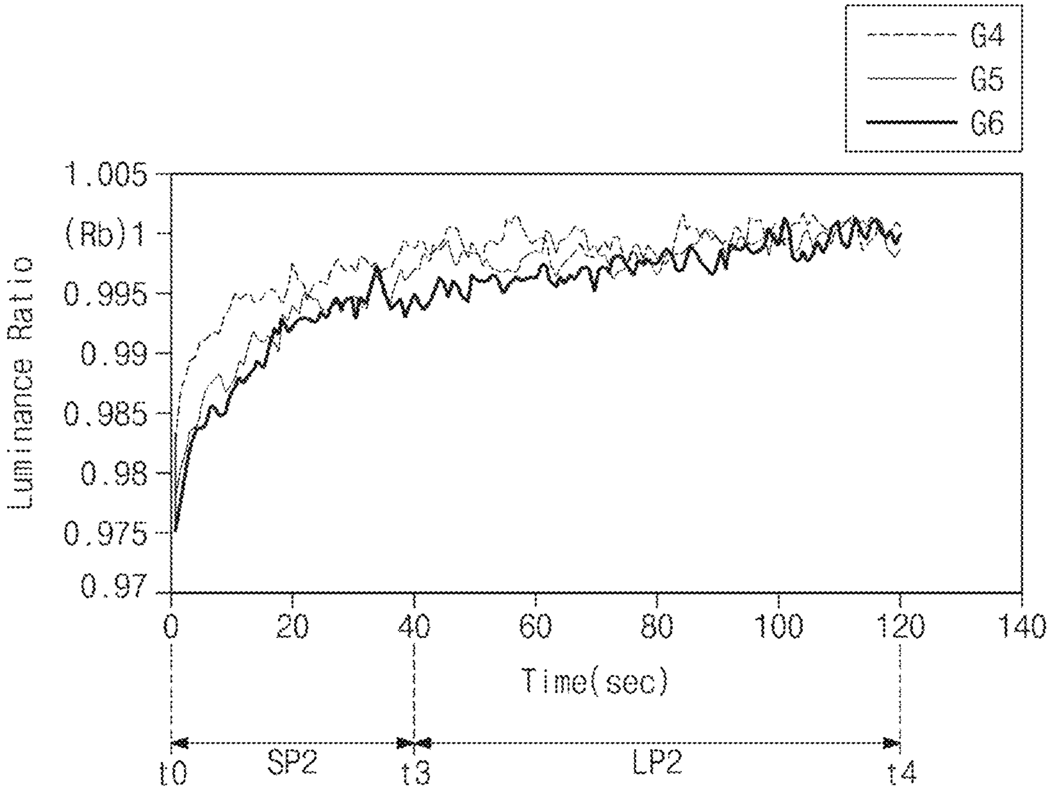
FIG. 6B is a graph showing an medium-term afterimage displayed in a second area as a function of a display time of a still image.
Figure 6C:
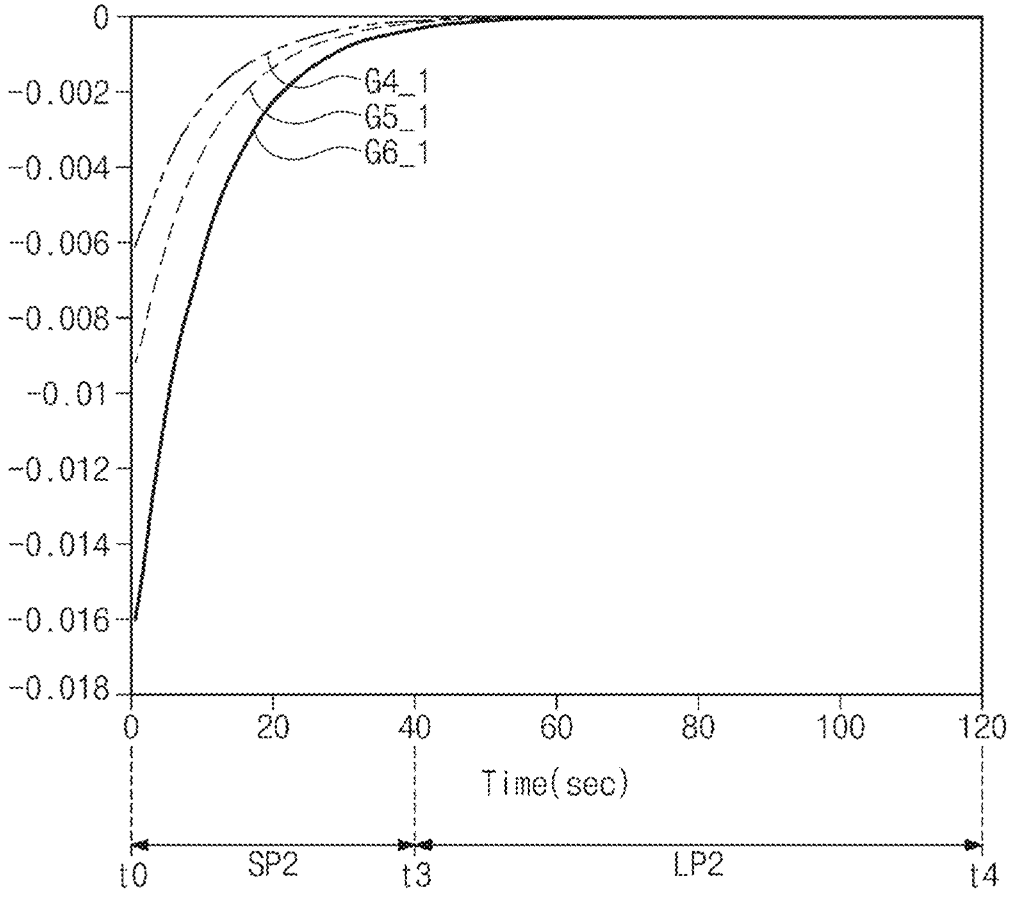
FIG. 6C is a graph showing a tendency with respect to a first afterimage component of the medium-term afterimage shown in FIG. 6B.
Figure 6D:
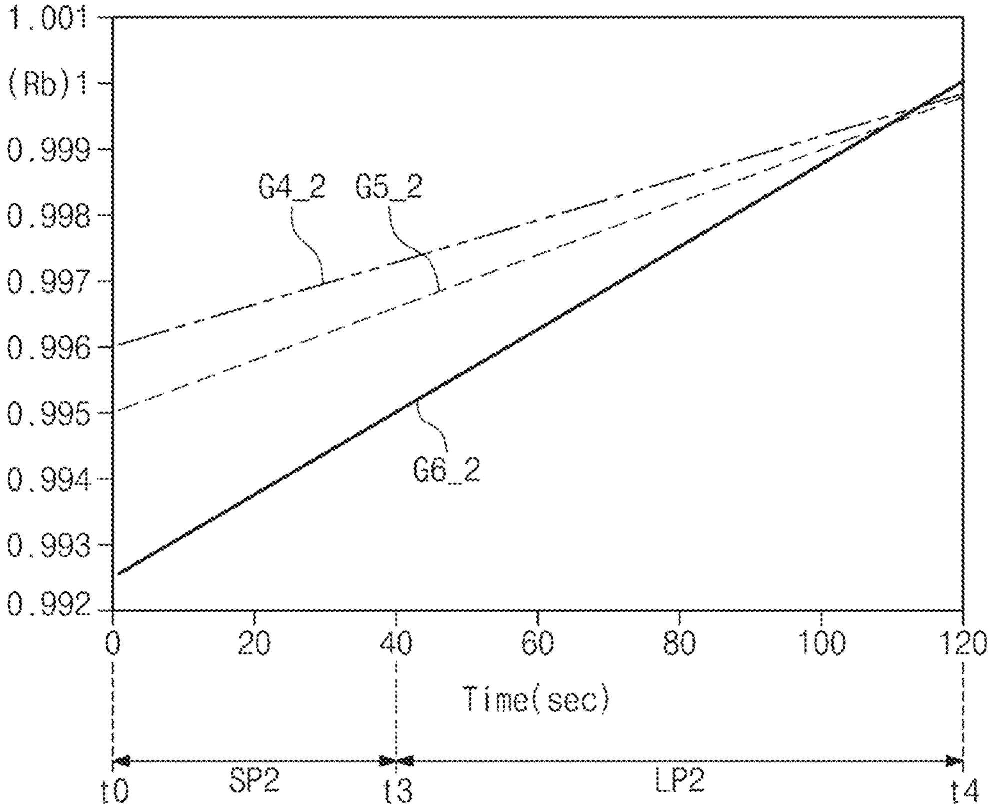
FIG. 6D is a graph showing a tendency with respect to a second afterimage component of the medium-term afterimage shown in FIG. 6B.

FIG. 6A is a graph showing the medium-term afterimage displayed in the first area of FIG. 5B as a function of the display time of the still image, and FIG. 6B is a graph showing the medium-term afterimage displayed in the second area as a function of the display time of the still image. FIG. 6C is a graph showing a tendency with respect to a first afterimage component of the medium-term afterimage shown in FIG. 6B, and FIG. 6D is a graph showing a tendency with respect to a second afterimage component of the medium-term afterimage shown in FIG. 6B.

Referring to FIGS. 5B, 6A, and 6B, when the grayscale of the still image is lower than the target grayscale, a medium-term afterimage having a luminance ratio higher than a reference luminance ratio Rb may occur. The reference luminance ratio Rb may be obtained by dividing a luminance (or grayscale) (hereinafter, referred to as a "target luminance") of the target image by a self-luminance (or real luminance) and may be set to 1.

The luminance ratio may be defined as a ratio of the luminance (or grayscale) of the afterimage to the target luminance. In this case, when the target luminance and the luminance of the afterimage are the same as each other, the luminance ratio of the afterimage luminance to the target luminance may be the same as the reference luminance ratio Rb.

The luminance ratio of the first afterimage luminance to the target luminance may be greater than the reference luminance ratio Rb. That is, when the luminance of the still image is lower than the target luminance, the medium-term afterimage having the luminance ratio smaller than the reference luminance ratio Rb may occur. The luminance ratio of the second afterimage to the target luminance may be smaller than the reference luminance ratio Rb. That is, when the luminance of the still image is higher than the target luminance, the medium-term afterimage having the luminance ratio greater than the reference luminance ratio Rb may occur.

The luminance ratio of the medium-term afterimage may be changed depending on the time during which the still image is displayed. In FIG. 6A, a first graph G1 represents the luminance ratio according to an elapsed time when the first still image is displayed for about 10 seconds, a second graph G2 represents the luminance ratio according to the elapsed time when the first still image is displayed for about 60 seconds, and the third graph G3 represents the luminance ratio according to the elapsed time when the first still image is displayed for about 120 seconds.

According to the first to third graphs G1 to G3, afterimage characteristics of the first afterimage may be different depending on the display time of the first still image. In particular, as the time during which the first still image is displayed increases, the luminance ratio is high during an initial period (for example, within about 40 seconds).

In FIG. 6B, a fourth graph G4 represents the luminance ratio according to an elapsed time when the second still image is displayed for about 10 seconds, a fifth graph G5 represents the luminance ratio according to the elapsed time when the second still image is displayed for about 60 seconds, and a sixth graph G6 represents the luminance ratio according to the elapsed time when the second still image is displayed for about 120 seconds.

According to the fourth to sixth graphs G4 to G6, afterimage characteristics of the second afterimage may be different depending on the display time of the second still image. In particular, the time during which the second still image is displayed increases, the luminance ratio is low during an initial period (for example, within about 60 seconds).

As represented by the first to third graphs G1 to G3, the first afterimage may have a first tendency during a first period SP1 from a start point t0, at which the first still image is changed to the first afterimage, to a first midpoint t1. In addition, the first afterimage may have a second tendency during a second period LP1 from the first midpoint t1 to a time point t2 at which the medium-term afterimage is finished. The first tendency may be similar to a tendency of a temporary afterimage (i.e., short-term afterimage), and the second tendency may be similar to a tendency of a long-term burn-in (i.e., long-term afterimage). According to the present disclosure, the driving controller 100 (refer to FIG. 2) may calculate a final afterimage component (value) of the first afterimage according to a time using an afterimage algorithm to which both the first and second tendencies are reflected. The driving controller 100 may adjust a constant value used in the afterimage algorithm and thus may reflect the first and second tendencies to the afterimage algorithm.

As represented by the fourth to sixth graphs G4 to G6, the second afterimage may have a third tendency during a third period SP2 from a start point t0, at which the second still image is changed to the second afterimage, to a second midpoint t3. In addition, the second afterimage may have a fourth tendency during a fourth period LP2 from the second midpoint t3 to a time point t4 at which the medium-term afterimage is finished. The third tendency may be similar to the tendency of the temporary afterimage (i.e., short-term afterimage), and the fourth tendency may be similar to a tendency of a long-term burn-in (i.e., long-term afterimage). According to the present disclosure, the driving controller 100 (refer to FIG. 2) may calculate a final afterimage component (value) of the second afterimage according to a time using an afterimage algorithm to which both the third and fourth tendencies are reflected. The driving controller 100 may adjust a constant value used in the afterimage algorithm and thus may reflect the third and fourth tendencies to the afterimage algorithm.

The afterimage algorithm f(x) according to an embodiment of the present disclosure is defined by the following Equation 1.

$$f(x)=f1(x)+f2(x) \quad \text{[Equation 1]}$$

In Equation 1, f1(x) denotes a first afterimage calculation equation, and f2(x) denotes a second afterimage calculation equation. As used herein, the afterimage algorithm f(x) may represent an afterimage, especially, a mid-term afterimage, the first afterimage calculation equation f1(x) may represent the short-term afterimage, and the second afterimage calculation equation f2(x) may represent the long-term afterimage.

The first afterimage calculation equation f1(x) is defined by the following Equation 2.

$$f1(x)=ae^{bx} \quad \text{[Equation 2]}$$

The second afterimage calculation equation is defined by one of the following Equations 3, 4, and 5.

$$f2(x)=Rb+cx+d \quad \text{[Equation 3]}$$

$$f2(x)=cx+d \quad \text{[Equation 4]}$$

$$f2(x)=ce^{dx} \quad \text{[Equation 5])}$$

In Equations 1 to 5, each of a, b, c, and d may be a constant. Rb may be the reference luminance ratio. In the condition in which the first afterimage is displayed, values of a and c may be positive values, and in the condition in which the second afterimage is displayed, the values of a and c may be negative values. The value of each of a, b, c, and d may be changed depending on the display time of the still image and a difference between the grayscale of the still image and the target grayscale.

Referring to FIG. 6C, a seventh graph G4_1 represents the first afterimage component extracted from the fourth graph G4 by the first afterimage calculation equation f1(x), an eighth graph G5_1 represents the first afterimage component extracted from the fifth graph G5 by the first afterimage calculation equation f1(x), and a ninth graph G6_1 represents the first afterimage component extracted from the sixth graph G6 by the first afterimage calculation equation f1(x).

Referring to FIG. 6D, a tenth graph G4_2 represents the second afterimage component extracted from the fourth graph G4 by the second afterimage calculation equation f2(x), an eleventh graph G5_2 represents the second afterimage component extracted from the fifth graph G5 by the second afterimage calculation equation f2(x), and a twelfth graph G6_2 represents the second afterimage component extracted from the sixth graph G6 by the second afterimage calculation equation f2(x).

During the third period SP2, the first afterimage component may have the negative value, and the second afterimage component may have a value smaller than 1 and greater than 0. A sum of the second afterimage component and the first afterimage component may be calculated as the final afterimage component in the third period SP2. As an example, during the fourth period LP2, the first afterimage component may have a value of 0, and the second afterimage component may have a value smaller than 1 and greater than 0. Accordingly, the second afterimage component alone may be calculated as the final afterimage component during the fourth period LP2.

That is, the first afterimage component calculated by the first afterimage calculation equation f1(x) may converge to zero (0) as a time elapses. In addition, the second afterimage component calculated by the second afterimage calculation equation f2(x) may converge to 1 as a time elapses or may be maintained at 1 after the certain period of time elapses (that is, after the fourth period LP2 elapses).

Figure 7A:
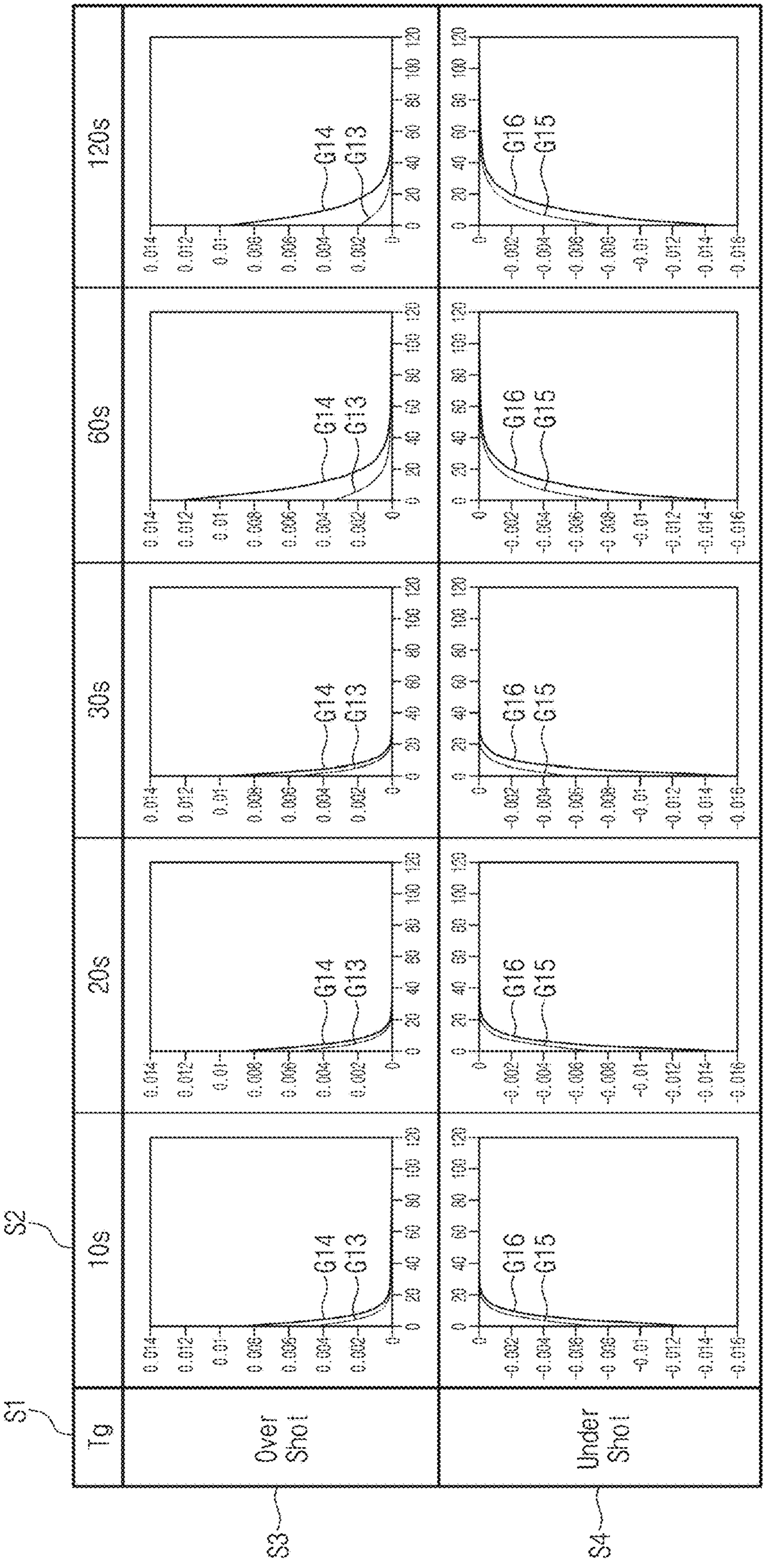
FIG. 7A are graphs showing a first afterimage component extracted according to a display time of a still image.
Figure 7B:
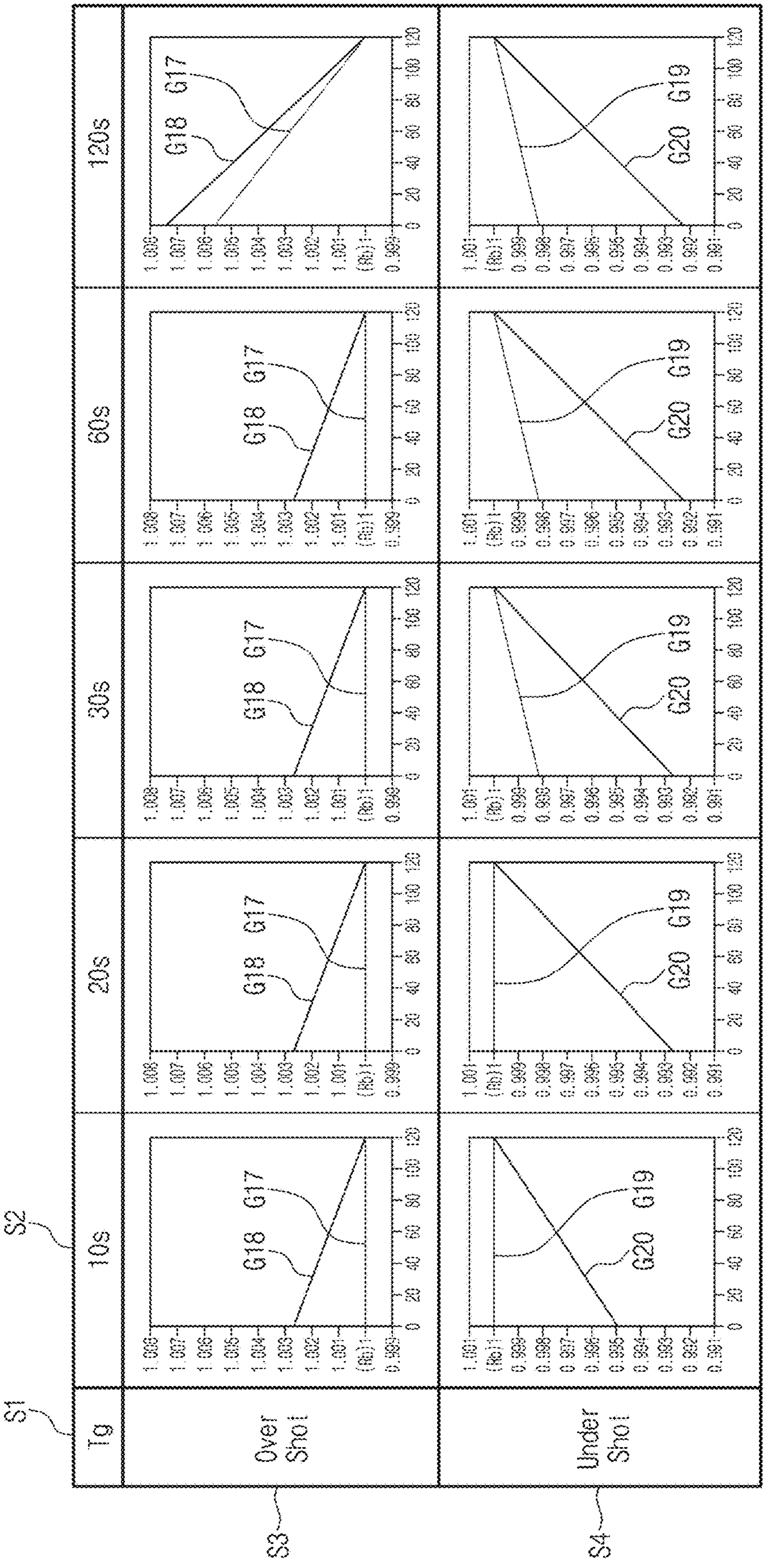
FIG. 7B are graphs showing a second afterimage component extracted according to a display time of a still image.

FIG. 7A are graphs showing the first afterimage component extracted according to a display time of a still image, and FIG. 7B are graphs showing the second afterimage component extracted according to a display time of a still image.

In FIG. 7A, a first section S1 represents a target grayscale Tg, and a second section S2 represents the display time of the still image. A third section S3 represents first afterimage components extracted when the still image has a grayscale lower than the target grayscale Tg (hereinafter, referred to as an "over-shot case") according to a specific grayscale, a fourth section S4 represents first afterimage components extracted when the still image has a grayscale higher than the target grayscale Tg (hereinafter, referred to as an "under-shot case") according to the specific grayscale. FIG. 7A shows the over-shot case of the first afterimage component with respect to two specific grayscales (hereinafter, referred to as "first and second reference grayscales") and the under-shot case of the first afterimage component with respect to two specific grayscales (hereinafter, referred to as "third and fourth reference grayscales").

In FIG. 7B, a first section S1 represents the target grayscale Tg, and a second section S2 represents the display time of the still image. A third section S3 represents second afterimage components extracted in the over-shot case according to the specific grayscale, and a fourth section S4 represents second afterimage components extracted in the under-shot case according to the specific grayscale. FIG. 7B shows the over-shot case of the second afterimage component with respect to the first and second reference grayscales and the under-shot case of the second afterimage component with respect to the third and fourth reference grayscales.

As an example, the target grayscale Tg may be 16 grayscale, the first and second reference grayscales may be 8 grayscale and 0 grayscale, respectively, and the third and fourth reference grayscales may be 32 grayscale and 128 grayscale, respectively.

In the third section S3 of FIG. 7A, a thirteenth graph G13 represents the first afterimage components measured when the still image has the first reference grayscale, and a fourteenth graph G14 represents the first afterimage components measured when the still image has the second reference grayscale. In the fourth section S4 of FIG. 7A, a fifteenth graph G15 represents the first afterimage components when the still image has the third reference grayscale, and a sixteenth graph G16 represents the first afterimage components measured when the still image has the fourth reference grayscale.

According to FIG. 7A, the first afterimage component may have a positive value greater than 0 in the over-shot case, and the first afterimage component may have a negative value smaller than 0 in the under-shot case. In addition, as the difference between the target grayscale Tg and the grayscale of the still image increases, an absolute value of the first afterimage component may increase.

In the third section S3 of FIG. 7B, a seventeenth graph G17 represents the second afterimage components measured when the still image has the first reference grayscale, and an eighteenth graph G18 represents the second afterimage components measured when the still image has the second reference grayscale. In the fourth section S4 of FIG. 7B, a nineteenth graph G19 represents the second afterimage components measured when the still image has the third reference gray scale, and a twentieth graph G20 represents the second afterimage components measured when the still image has the fourth reference grayscale.

According to FIG. 7B, the second afterimage component may have a value greater than the reference luminance ratio Rb (for example, 1) in the over-shot case, and the second afterimage component may have a value smaller than the reference luminance ratio Rb in the under-shot case. In addition, as the difference between the target grayscale Tg and the grayscale of the still image increases, a difference between the second afterimage component and the reference luminance ratio Rb may increase.

The driving controller 100 (refer to FIG. 2) may generate a compensation value using the final afterimage component calculated through the above-described process. Hereinafter, a process of generating the compensation value by using the driving controller 100 will be described.

Figure 8A:
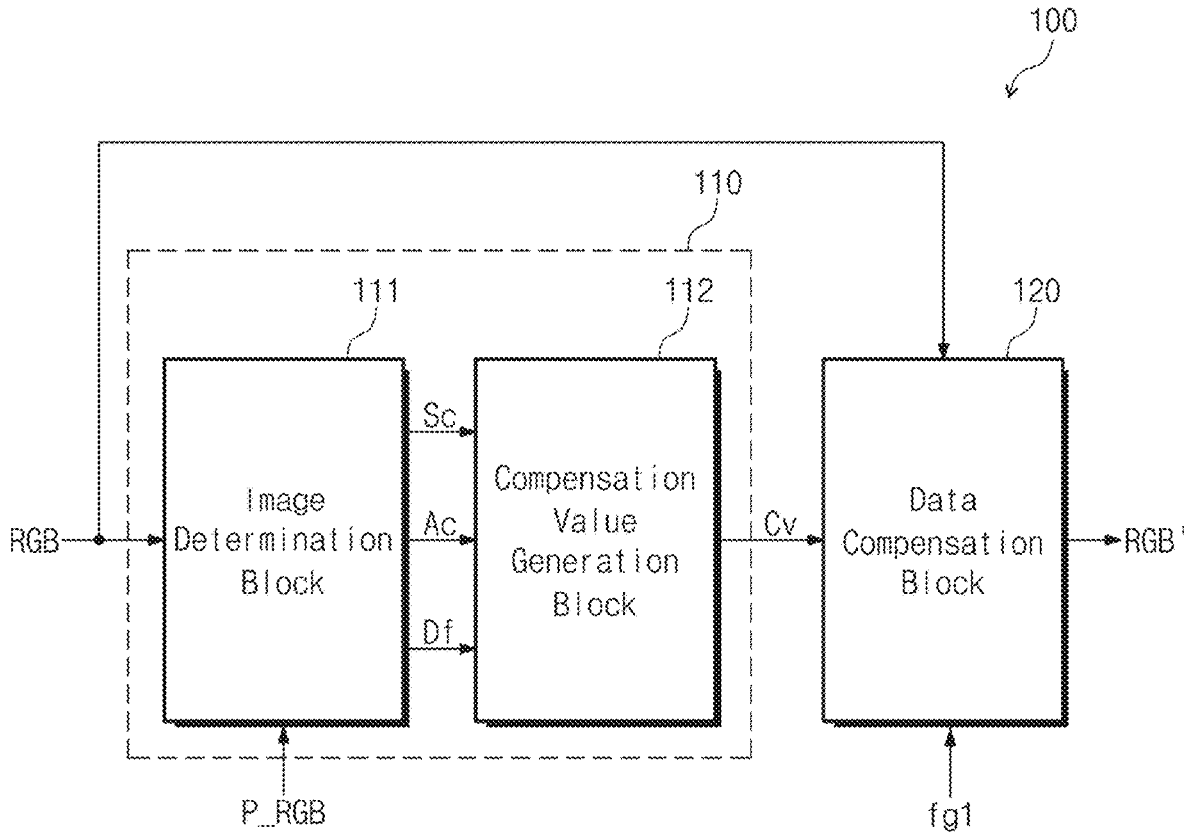
FIG. 8A is a block diagram of a driving controller shown in FIG. 2.
Figure 8B:
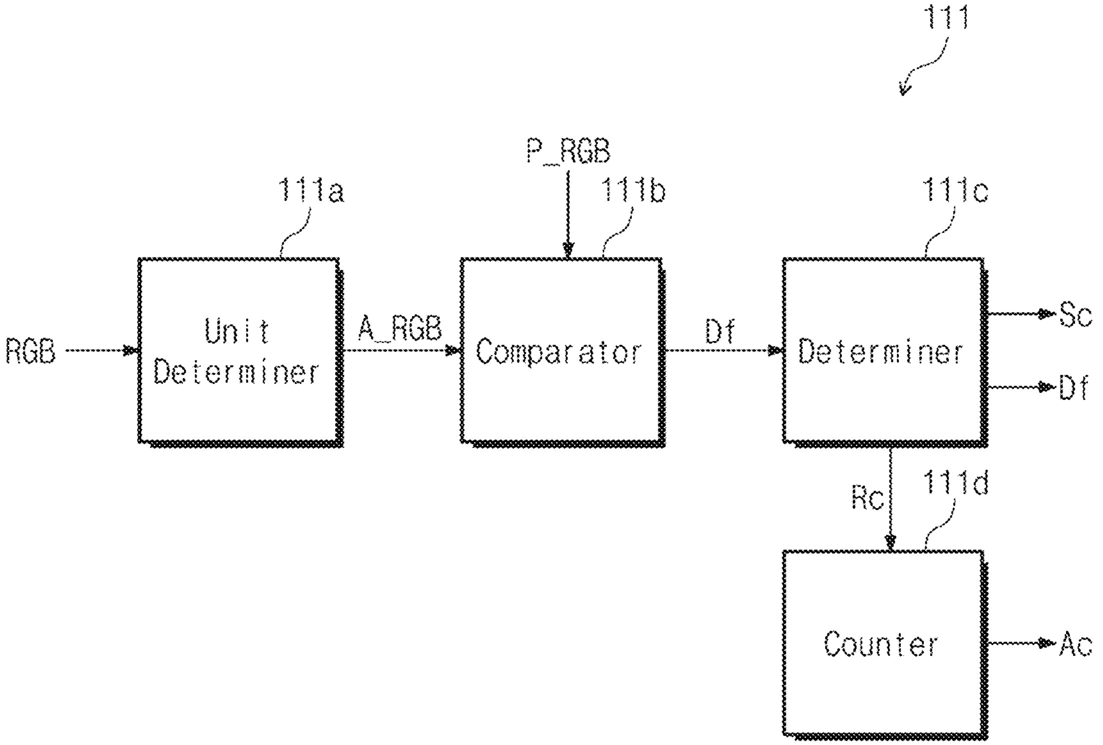
FIG. 8B is a block diagram of an image determination block shown in FIG. 8A.
Figure 8C:
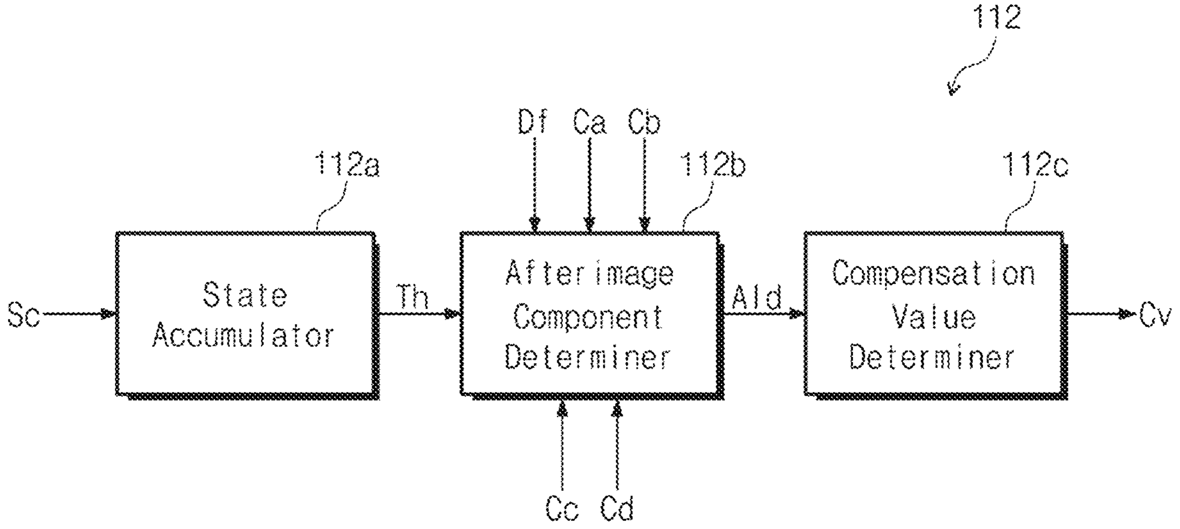
FIG. 8C is a block diagram of a compensation value generation block shown in FIG. 8A.
Figure 9:
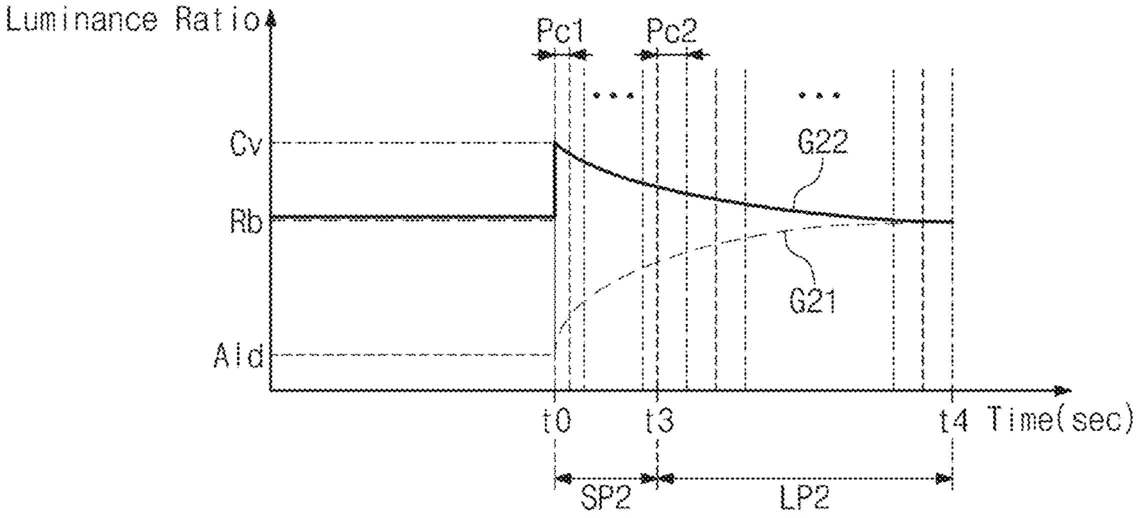
FIG. 9 is a waveform diagram of a relationship between a compensation value and a final afterimage component according to an embodiment of the present disclosure.

FIG. 8A is a block diagram of the driving controller 100 shown in FIG. 2, FIG. 8B is a block diagram of an image determination block 111 shown in FIG. 8A, and FIG. 8C is a block diagram of a compensation value generation block 112 shown in FIG. 8A. FIG. 9 is a waveform diagram of a relationship between the compensation value and the final afterimage component according to an embodiment of the present disclosure.

Referring to FIG. 8A, the driving controller 100 may include a compensation determination block 110 and a data compensation block 120. The compensation determination block 110 may be activated after the still image is displayed for a predetermined time or more. The compensation determination block 110 may generate the compensation value Cv based on the final afterimage component calculated using the afterimage algorithm f(x) obtained by a combination of the first afterimage calculation equation f1(x) and the second afterimage calculation equation f2(x).

The data compensation block 120 may receive the image signal RGB and may reflect the compensation value Cv to the image signal RGB to generate a compensation image signal RGB'. The data compensation block 120 may be activated in response to a flag signal fg1. The flag signal fg1 may be enabled in the period when the still image is displayed and may be disabled in the period when the video (i.e., moving image) is displayed. Accordingly, the data compensation block 120 may be activated in response to the flag signal fg1 enabled in the period when the still image is displayed and may be deactivated in response to the flag signal fg1 disabled in the period when the video is displayed. In the period when the data compensation block 120 is deactivated, the driving controller 100 may output the image signal RGB without compensating for the image signal RGB, and in the period when the data compensation block 120 is activated, the driving controller 100 may output the compensation image signal RGB'.

As an example, the compensation determination block 110 may include the image determination block 111 and the compensation value generation block 112. The image determination block 111 may compare a previous image signal P_RGB with the image signal RGB (i.e., a current image signal) currently input to calculate a variation amount Df and may determine whether the image is changed based on the variation amount Df. The previous image signal P_RGB may be provided from a memory. The image determination block 111 may compare the previous image signal P_RGB with the current image signal RGB in units of one frame and may compare the previous image signal P_RGB with the current image signal RGB in units of one line. In a case that the previous image signal P_RGB is compared with the current image signal RGB in units of one frame, the previous image signal P_RGB may be an image signal of a previous frame, and the current image signal RGB may be an image signal of a current frame. In a case that the previous image signal P_RGB is compared with the current image signal RGB in units of one line, the previous image signal P_RGB may be an image signal corresponding to a previous line, and the current image signal RGB may be an image signal corresponding to a current line.

As shown in FIG. 8B, the image determination block 111 may include a comparison unit determiner 111*a* (hereinafter, referred to as a "unit determiner"), a comparator 111*b*, a determiner 111*c*, and a counter 111*d*. The unit determiner 111*a* may receive the current image signal RGB. The unit determiner 111*a* may receive the current image signal RGB in units of one line. In a case where the unit for the comparison is one frame, the unit determiner 111*a* may receive the current image signal RGB until a current image signal A_RGB (hereinafter, a "cumulative image signal") corresponding to one frame is accumulated. When the cumulative image signal A_RGB corresponding to one frame is accumulated, the unit determiner 111*a* may transmit the cumulative image signal A_RGB to the comparator 111*b*. In a case where the unit for the comparison is one line, the unit determiner 111*a* may transmit the current image signal RGB in a unit of one line to the comparator 111*b* without accumulating the current image signal RGB applied thereto.

The comparator 111*b* may compare the previous image signal P_RGB with the cumulative image signal A_RGB to calculate the variation amount Df. The comparator 111*b* may transmit the calculated variation amount Df to the determiner 111*c*. When the previous image signal P_RGB is compared with the cumulative image signal A_RGB, the comparator 111*b* may use only some bits of information among all bits. As an example, when the image signal is an 8-bit signal, only the upper 4 bits of information may be used to compare the previous image signal P_RGB with the cumulative image signal A_RGB.

The determiner 111*c* may compare the variation amount Df with a predetermined reference value (e.g., 0) to determine whether the image is changed. When the variation amount Df is the same as the reference value, the determiner 111*c* may determine that the image is the still image and may transmit an incremental value Rc to the counter 111*d* to count the display time of the still image. The counter 111*d* may receive the incremental value Rc and may accumulate the incremental value Rc. In a case where the incremental value Rc is not received in predetermined unit (for example, the determiner 111*c*), the counter 111*d* may reset the accumulated value Ac (i.e., a cumulative value). When the reception of the incremental value Rc is finished and a request for the cumulative value Ac is received from the compensation value generation block 112, the counter 111*d* may transmit the cumulative value Ac to the compensation value generation block 112.

In addition, when the variation amount Df is different from the reference value, the determiner 111*c* may output the variation amount Df to the compensation value generation block 112. After a time point at which it is determined first that the variation amount Df is different from the reference value (for example, a time point at which an image signal corresponding to a target image is input, which corresponds to the start point t0 of FIGS. 6A to 6D), the determiner 111*c* may transmit a state signal Sc that indicates this status to the compensation value generation block 112.

The compensation value generation block 112 may receive the variation amount Df and the state signal Sc and may generate the afterimage algorithm. When the variation amount Df is the same as the reference value (for example, when the still image is displayed), the compensation value generation block 112 may be deactivated. That is, since the medium-term afterimage does not occur while the still image is being displayed, the compensation value generation block 112 may be deactivated.

However, when the variation amount Df is different from the reference value, the compensation value generation block 112 may be activated, and the compensation value generation block 112 may generate the compensation value Cv using the afterimage algorithm f(x).

As shown in FIG. 8C, the compensation value generation block 112 may include a state accumulator 112*a*, an afterimage component determiner 112*b*, and a compensation value determiner 112*c*. After a medium-term afterimage compensation operation starts, in a case where the variation amount Df is the different from the reference value, the state accumulator 112*a* may receive the state signal Sc from the image determination block 111 (e.g., the determiner 111*c*) and accumulate the state signal Sc. The state accumulator 112*a* may output the accumulated state result Th in units of predetermined reference time. The state accumulator 112*a* may be activated after the image signal corresponding to the target image is provided to the driving controller 100 and then may receive the state signal Sc.

The afterimage component determiner 112*b* may generate the afterimage algorithm f(x) based on the variation amount Df and the accumulated state result Th and may calculate the final afterimage component AId using the afterimage algorithm f(x). As the afterimage component determiner 112*b* generates the afterimage algorithm f(x) using the variation amount Df, the afterimage component determiner 112*b* may generate the final afterimage component AId by taking into account the difference between the grayscale of the still image and the target grayscale. The afterimage component determiner 112*b* may generate the afterimage algorithm f(x) using the state result Th, and thus, the afterimage component determiner 112*b* may periodically generate the final afterimage component AId by taking into account the display time of the afterimage.

The afterimage component determiner 112*b* may further receive the cumulative value Ac from the image determination block 111, e.g., the counter 111*d*. The cumulative value Ac may also be used to generate the afterimage algorithm f(x). The afterimage component determiner 112*b* may calculate the final afterimage component AId by taking into account the time during which the still image is displayed, through the cumulative value Ac.

The afterimage component determiner 112*b* may receive information Ca, Cb, Cc, and Cd about the constant values of the a, b, c, and d used in the first and second afterimage calculation equations f1(x) and f2(x). The information Ca, Cb, Cc, and Cd about the constant values of the a, b, c, and d may be changed depending on the difference between the grayscale of the still image and the target grayscale, the display time of the still image, and the display time of the afterimage. As an example, a time interval in which the information Ca and Cb about the constant values of the a and the b is changed may be shorter than a time interval in which the information Cc and Cd about the constant values of the c and the d is changed. Alternatively, the information Ca and Cb about the constant values of the a and the b may have a fixed value regardless of the display time of the still image. In this case, only the information Cc and Cd about the constant values of the c and the d may have a value changed depending on the display time of the still image.

The compensation value determiner 112*c* may generate the compensation value Cv based on the final afterimage component AId. In FIG. 9, a twenty-first graph G21 represents a final afterimage component AId calculated by the afterimage component determiner 112*b*, and a twenty-second graph G22 represents the compensation value Cv calculated by the compensation value determiner 112*c*. As shown in FIG. 9, the compensation value Cv may have a value equal or substantially equal to a reciprocal of the final afterimage component AId with respect to the reference luminance ratio Rb.

The final afterimage component AId at the start point t0 (that is, a case where x is 0) may be determined according to the constant values of the a and the d in the first and second afterimage calculation equations f1(x) and f2(x).

The compensation value determiner 112*c* may update the compensation value Cv in the units of a first compensation interval Pc1 during the third period SP2 or the first period SP1 (refer to FIG. 6A) and may update the compensation value Cv in the units of a second compensation interval Pc2 during the fourth period LP2 or the second period LP1 (refer to FIG. 6A). The first compensation interval Pc1 may be different from the second compensation interval Pc2. As an example, the first compensation interval Pc1 may be smaller than the second compensation interval Pc2. Accordingly, in the third period SP2 where the final afterimage component AId is changed rapidly, a compensation interval may be shortened to compensate for the medium-term afterimage, and in the fourth period LP2 where the final afterimage component AId is changed slowly, a compensation interval may be lengthened to compensate for the medium-term afterimage.

As described above, as the compensation value Cv is generated based on the final afterimage component AId calculated by the afterimage algorithm and the image signal RGB is compensated for by the compensation value Cv, the medium-term afterimage may be removed even within a certain period of time during which the medium-term afterimage occurs, and as a result, the deterioration in display quality of the display device DD, which is caused by the medium-term afterimage, may be effectively prevented. In addition, as the medium-term afterimage is compensated for using the afterimage algorithm f(x) rather than using a lookup table, the increase of the number of the component parts of the display device DD due to a memory for the lookup table may be prevented. Since the afterimage algorithm f(x) is obtained by a combination of the first afterimage calculation equation f1(x) to extract the first afterimage component and the second afterimage calculation equation f2(x) to extract the second afterimage component, the final afterimage component similar to an actual measurement value of the medium-term afterimage may be calculated. Accordingly, the compensation for the medium-term afterimage may be more precisely performed.

Figure 10A:
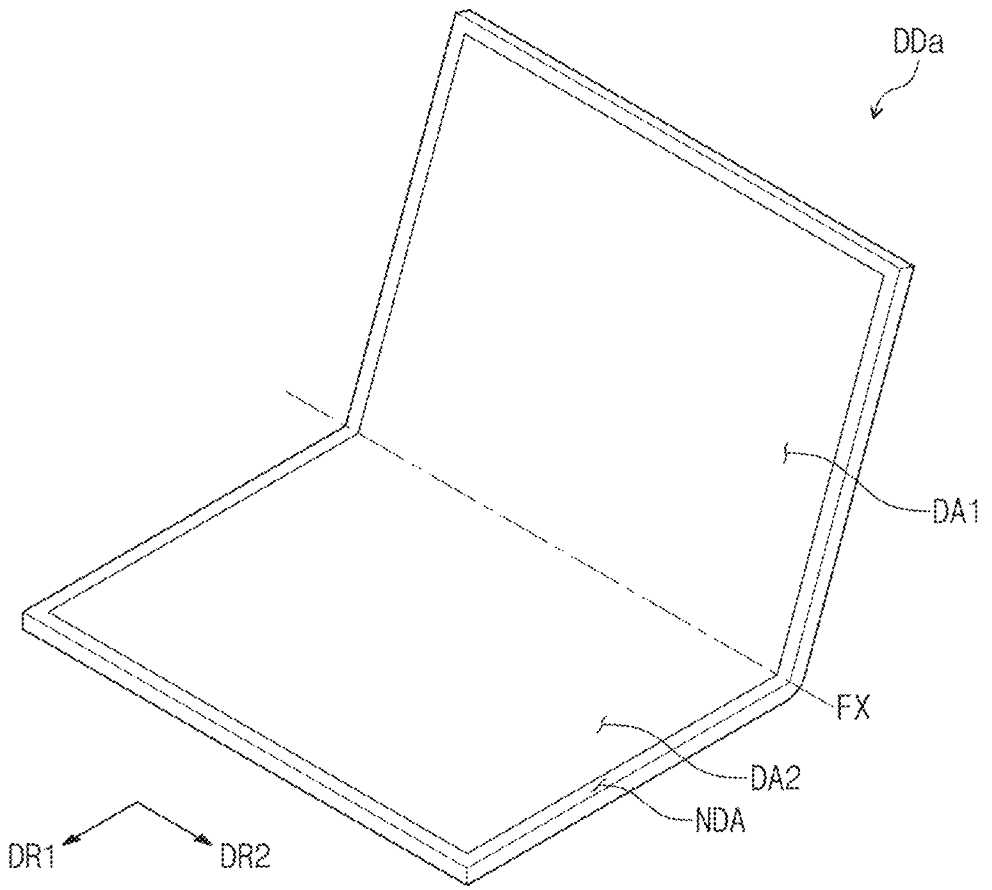
FIG. 10A is a perspective view of an in-folding state of a display device according to an embodiment of the present disclosure.
Figure 10B:
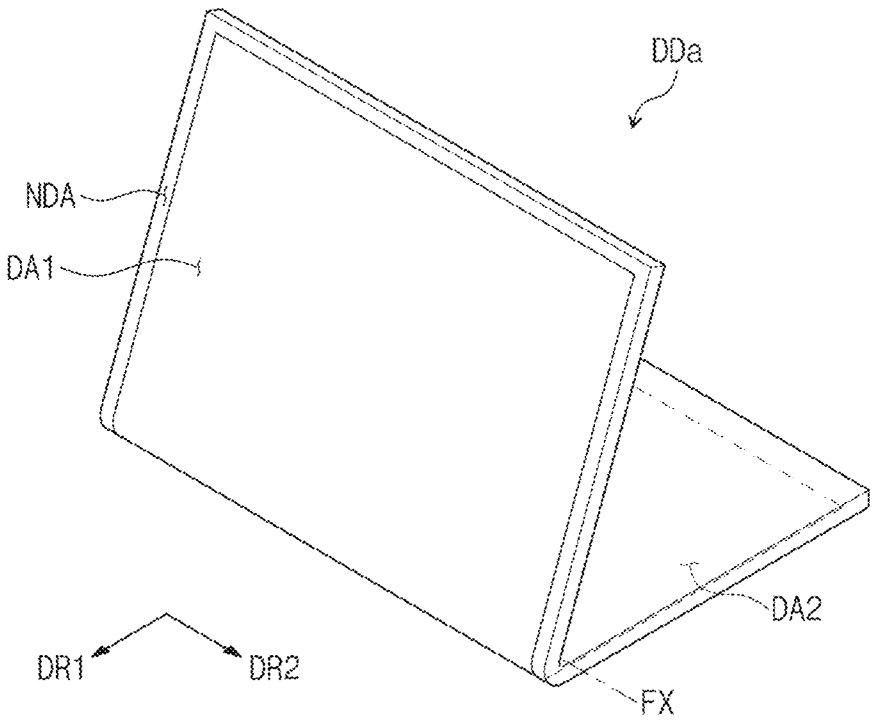
FIG. 10B is a perspective view of an out-folding state of a display device according to an embodiment of the present disclosure.

FIG. 10A is a perspective view of an in-folding state of a display device DDa according to an embodiment of the present disclosure, and FIG. 10B is a perspective view of an out-folding state of the display device DDa according to an embodiment of the present disclosure.

Referring to FIGS. 1, 10A, and 10B, the display device DDa may be a foldable display device. The display device DDa may include a display area DA, and the display area DA may be divided into a first display area DA1 and a second display area DA2 with respect to a folding axis FX. The folding axis FX may be parallel to the second direction DR2. In this case, the first and second display areas DA1 and DA2 may be arranged in the first direction DR1 perpendicular to the second direction DR2. In a case where the folding axis FX is parallel to the first direction DR1, the first and second display areas DA1 and DA2 may be arranged in the second direction DR2.

The display device DDa may be inwardly folded (in-folding) such that the first and second display areas DA1 and DA2 face each other as shown in FIG. 10A. According to an embodiment, the display device DDa may be outwardly folded (out-folding) such that the first and second display areas DA1 and DA2 are exposed to the outside as shown in FIG. 10B.

The display device DDa may be operated in a first mode in which an image is displayed using both the first and second display areas DA1 and DA2 or may be operated in a second mode (See FIG. 11A) in which an image is displayed using only one area of the first and second display areas DA1 and DA2. As an example, the display device DDa may be operated in the first mode when being in an unfolded state and may be operated in the second mode when being in a folded state.

FIGS. 10A and 10B show the display device DDa operated in the second mode as a representative example. In this case, the first display area DA1 is used to display the image in the second mode, however, the second display area DA2 is not used to display the image in the second mode. In the present embodiment, the image may be defined as an image including information provided to the user.

The first mode may be a normal mode in which both the first and second display areas DA1 and DA2 are normally operated. The second mode may be a partial operation mode in which only one area of the first and second display areas DA1 and DA2 is normally operated. In this case, the expression "the display area is normally operated" may mean that an operation to display an image including information for the user is performed.

The display device DDa may display the image using the first and second display areas DA1 and DA2 in the first mode, and the display device DDa may display the image using only one display area of the first and second display areas DA1 and DA2 in the second mode. As an example, in a case where the display device DDa displays the image using only the first display area DA1 in the second mode, the second display area DA2 may continuously display a reference image having a specific grayscale, for example, a black reference image having a black grayscale. In this case, the black reference image displayed in the second display area DA2 may be defined as an image displayed by a black data signal having the black grayscale, however, the present disclosure should not be limited thereto or thereby. According to another embodiment, the black reference image may be defined as an image displayed by a low grayscale data signal having a specific grayscale, e.g., a low grayscale.

Figure 11A:
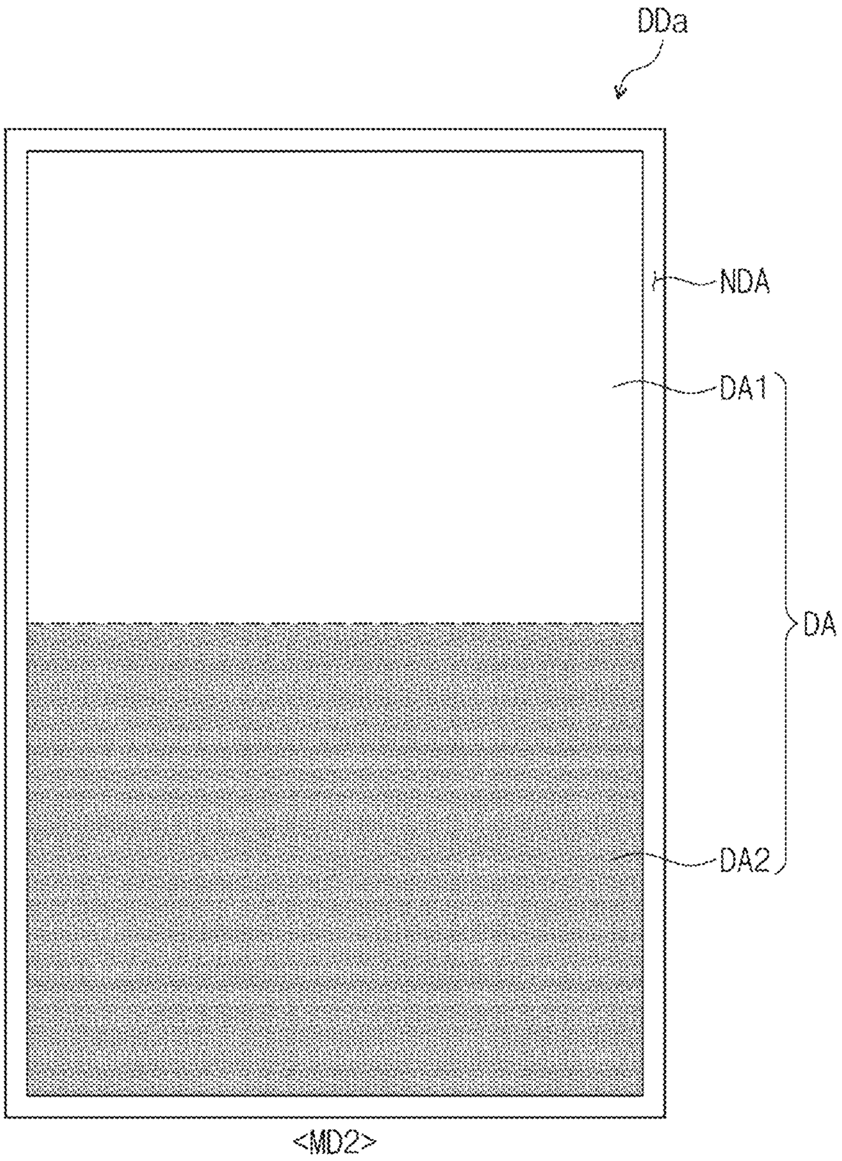
FIG. 11A is a plan view of a screen of a display device operated in a second mode.
Figure 11B:
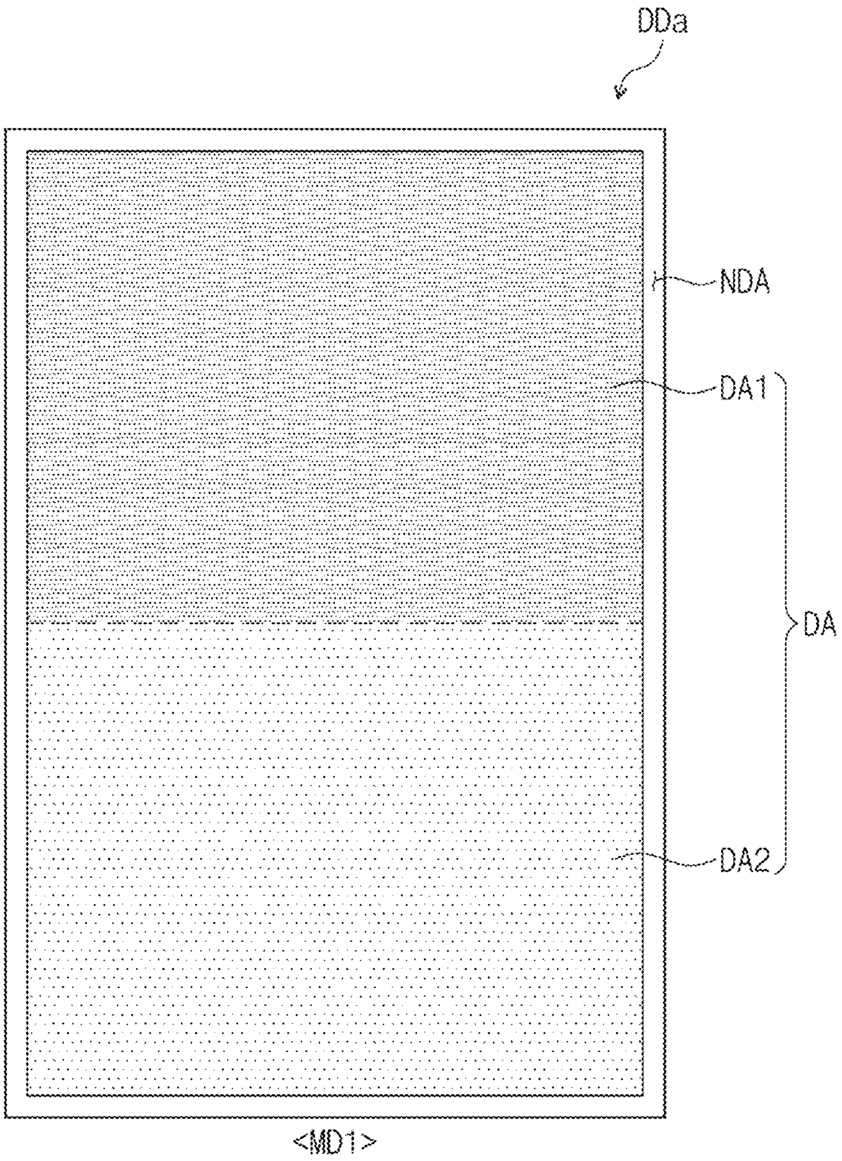
FIG. 11B is a plan view of a screen in which an medium-term afterimage is displayed after the second mode is changed to a first mode.
Figure 11C:
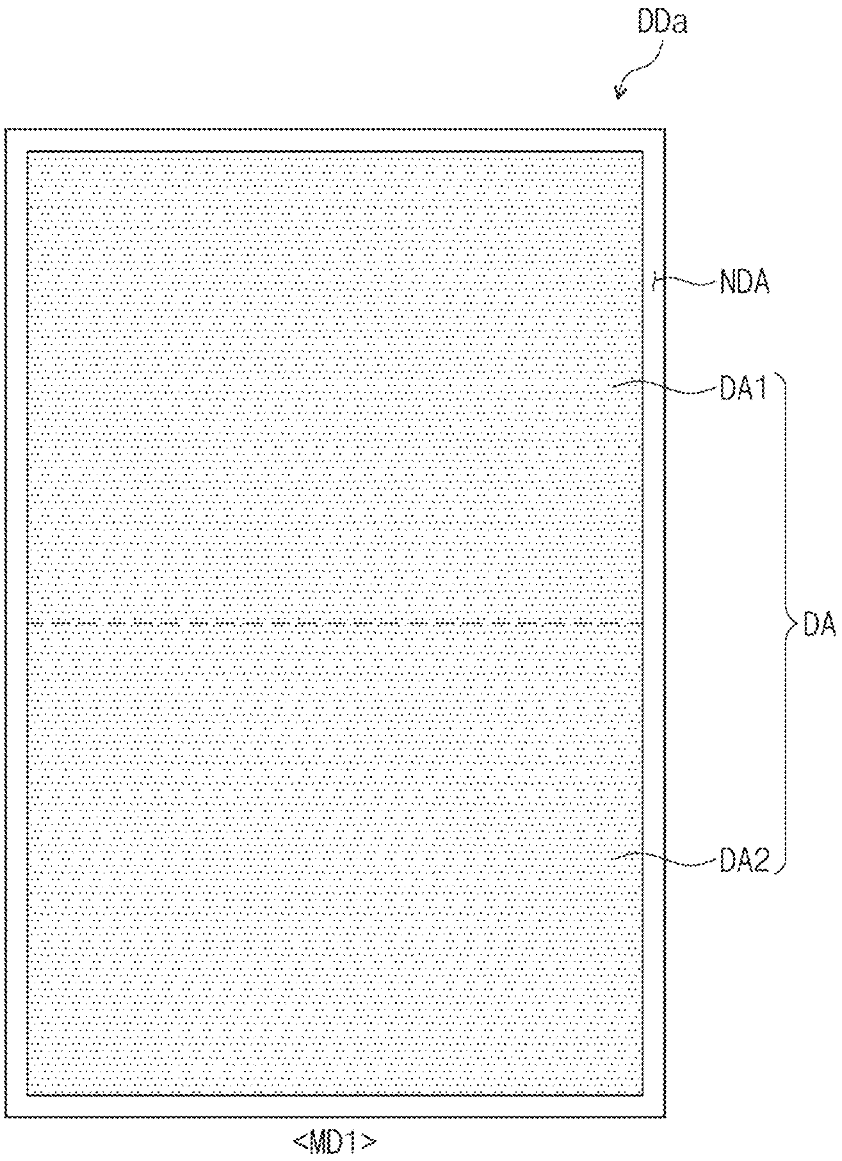
FIG. 11C is a plan view of a screen in which a target image is displayed in the first mode.

FIG. 11A is a plan view of a screen of the display device DDa operated in the second mode, FIG. 11B is a plan view of a screen in which the medium-term afterimage is displayed after the second mode is changed to the first mode, and FIG. 11C is a plan view of a screen in which the target image is displayed in the first mode.

Referring to FIGS. 11A to 11C, a normal image may be displayed in the first display area DA1 of the display device DDa in the second mode MD2, and a black image may be displayed in the second display area DA2 of the display device DDa in the second mode MD2.

When the second mode MD2 is terminated and the operation mode of the display device DDa is switched to the first mode MD1, the medium-term afterimage may occur in the second display area DA2. In a case where the second mode MD2 is terminated and the image having the target grayscale is displayed on the entire display area DA in the first mode MD1, the medium-term afterimage may occur in the second display area DA2 during the certain period of time as shown in FIG. 11B. Due to the medium-term afterimage, the difference in luminance may be recognized between the first and second display areas DA1 and DA2 during the certain period of time. After the certain period of time elapses, the target grayscale may be displayed in the display area DA as shown in FIG. 11C. A driving controller 100*a* (refer to FIG. 12) may compensate for the medium-term afterimage such that the user does not recognize the medium-term afterimage occurring in the second display area DA2 for the certain period of time.

Figure 12:
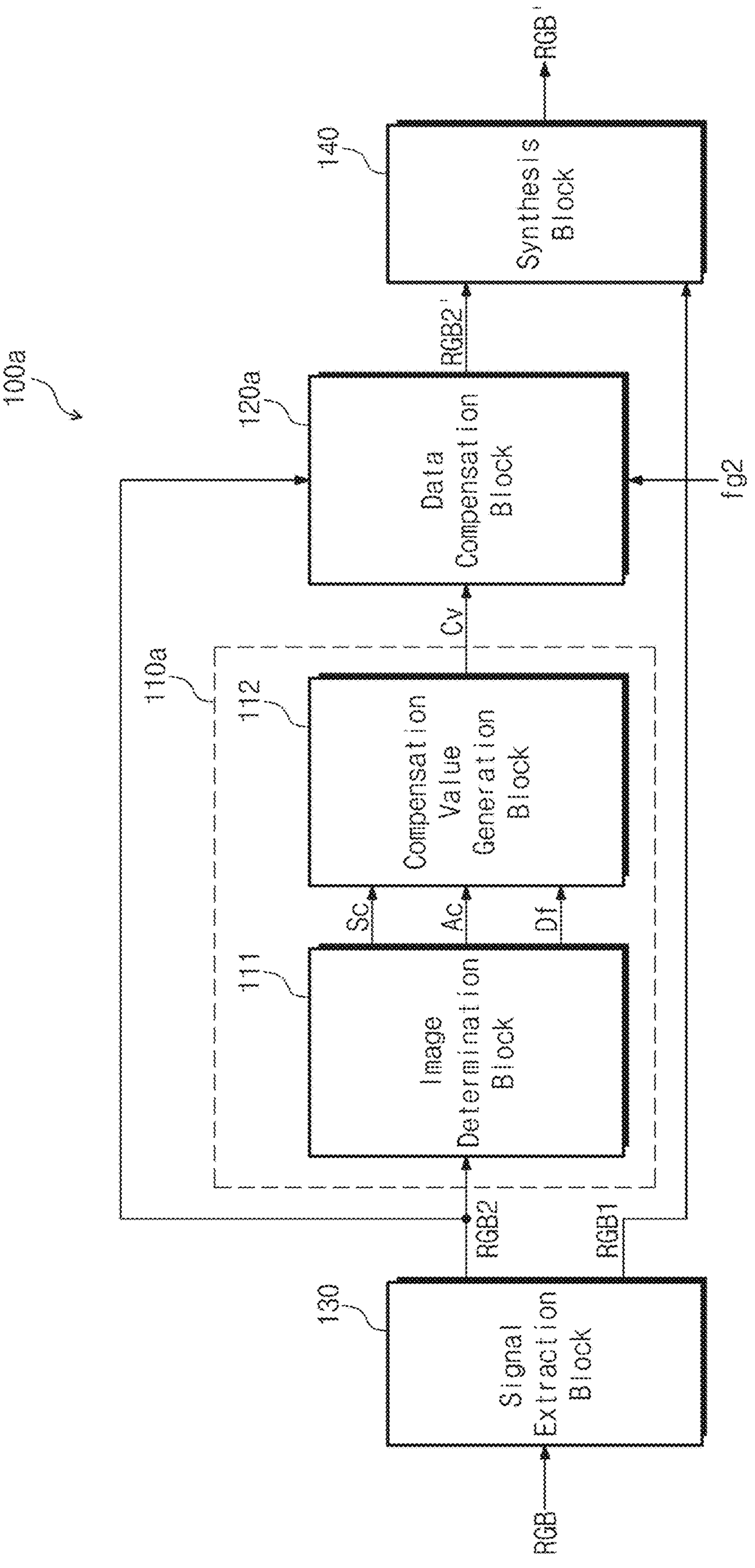
FIG. 12 is a block diagram of a driving controller according to another embodiment of the present disclosure.

FIG. 12 is a block diagram of the driving controller 100*a* according to another embodiment of the present disclosure.

Referring to FIGS. 11A, 11B, and 12, the driving controller 100*a* may include a signal extraction block 130, a compensation determination block 110*a*, a data compensation block 120*a*, and a synthesis block 140.

The signal extraction block 130 may receive an image signal RGB. The signal extraction block 130 may extract a first image signal RGB1 corresponding to the first display area DA1 and a second image signal RGB2 corresponding to the second display area DA2 from the image signal RGB. Since the medium-term afterimage does not occur in the first display area DA1, the first image signal RGB1 may not be provided to the compensation determination block 110*a*. Since the medium-term afterimage occurs in the second display area DA2, the second image signal RGB2 may be provided to the compensation determination block 110*a*.

The compensation determination block 110*a* may be activated after a time point at which the second mode MD2 is switched to the first mode MD1. The compensation determination block 110*a* may generate a compensation value Cv based on a final afterimage component calculated by using an afterimage algorithm f(x) obtained by a combination of a first afterimage calculation equation f1(x) and a second afterimage calculation equation f2(x).

The data compensation block 120*a* may receive the second image signal RGB2 and may reflect the compensation value Cv to the second image signal RGB2 to generate a second compensation image signal RGB2'. The data compensation block 120*a* may be activated in response to a flag signal fg2. The flag signal fg2 may be enabled in the first mode DM1 and may be disabled in the second mode DM2. Accordingly, the data compensation block 120*a* may be activated in response to the flag signal fg2 enabled in the first mode MD1 and may be deactivated in response to the flag signal fg2 disabled in the second mode MD2. In a period during which the data compensation block 120*a* is deactivated, the driving controller 100*a* may not compensate for the second image signal RGB2, and the driving controller 100*a* may compensate for the second image signal RGB2 in a period during which the data compensation block 120*a* is activated.

Operations of the compensation determination block 110*a* and the data compensation block 120*a* are substantially the same as those of FIGS. 8B and 8C, and thus, details thereof will be omitted to avoid redundancy.

The synthesis block 140 may receive the first image signal RGB1 and the second compensation image signal RGB2' and may synthesize the first image signal RGB1 and the second compensation image signal RGB2' to output the final compensation signal RGB'.

FIG. 12 shows the driving controller 100*a* including the signal extraction block 130 and the synthesis block 140, however, the present disclosure should not be limited thereto or thereby. According to another embodiment, the driving controller 100*a* may not include the signal extraction block 130 and the synthesis block 140, and in this case, the entire image signal RGB may be input into the compensation determination block 110*a* and the data compensation block 120*a*.

As used in connection with various embodiments of the disclosure, the term "block" may include a unit implemented in hardware, software, or firmware, and may be interchangeably used with other terms, for example, "logic," "logic block," "part," or "circuitry". A block may be a single integral component, or a minimum unit or part thereof, adapted to perform one or more functions. For example, according to an embodiment of the disclosure, the compensation determination block, the data compensation block, the image determination block, the compensation value generation block, signal extraction block, synthesis block, the unit determiner, the comparator, the determiner, the counter, the state accumulator, the after image component determiner, or the compensation value determiner may be implemented in a form of an application-specific integrated circuit (ASIC).

Although the embodiments of the present disclosure have been described, it is understood that the present disclosure should not be limited to these embodiments but various changes and modifications can be made by one ordinary skilled in the art within the spirit and scope of the present disclosure as hereinafter claimed. Therefore, the disclosed subject matter should not be limited to any single embodiment described herein, and the scope of the present invention shall be determined according to the attached claims.

What is claimed is:

1. A display device comprising:

a display panel, which displays an image;

a panel driver, which drives the display panel; and a driving controller, which controls a drive of the panel driver, the driving controller comprising:

a compensation determination block, which is activated after a still image is displayed for a predetermined time or more and generates a compensation value based on a final afterimage component calculated using an afterimage algorithm obtained by a combination of a first afterimage calculation equation and a second afterimage calculation equation; and a data compensation block, which receives an image signal and generates a compensation image signal by compensating the image signal based on the compensation value, wherein the compensation determination block generates the first and second afterimage calculation equations by reflecting a difference in grayscale between the still image and a target image and a time during which the still image is displayed, and the target image corresponds to an original image of the image signal without an afterimage, wherein the time, during which the still image is displayed, is divided into a first period and a second period, the compensation determination block calculates a first afterimage component for the first period using the first afterimage calculation equation, calculates a second afterimage component for the second period using the second afterimage calculation equation and calculates the final afterimage component based on the first afterimage component and the second afterimage component.

2. The display device of claim 1, wherein the compensation determination block comprises:

an image determination block, which compares a previous image signal with the image signal to generate a variation amount and compares the variation amount with a predetermined reference value to determine whether the still image and the target image are changed; and a compensation value generation block, which receives the variation amount and a state signal from the image determination block to generate the afterimage algorithm and outputs the compensation value using the afterimage algorithm.

3. The display device of claim 2, wherein the compensation value generation block comprises:

a state accumulator, which receives and accumulates the state signal from the image determination block when the variation amount is equal to the reference value and outputs an accumulated result of the state signal in units of a predetermined reference time;

an afterimage component determiner, which generates the afterimage algorithm based on the variation amount and the accumulated result and calculates the final afterimage component using the afterimage algorithm; and a compensation value determiner, which generates the compensation value based on the final afterimage component.

4. The display device of claim 3, wherein the compensation value determiner updates the compensation value in units of a first compensation interval during a first period and updates the compensation value in units of a second compensation interval during a second period, and the first compensation interval is different from the second compensation interval.

5. The display device of claim 4, wherein the first compensation interval is smaller than the second compensation interval, and the first period is before the second period.

6. The display device of claim 2, wherein the compensation determination block is deactivated in a period for which the still image is displayed and is activated from a time point at which the image signal is input.

7. The display device of claim 1, wherein the afterimage algorithm is defined by following Equation:

$$f(x)=f1(x)+f2(x),$$

where f(x) denotes the afterimage algorithm, f1(x) denotes the first afterimage calculation equation, and f2(x) denotes the second afterimage calculation equation.

8. The display device of claim 7, wherein the first afterimage calculation equation f1(x) is defined by following Equation:

$$f1(x)=ae^{bx},$$

where each of a and b is a constant.

9. The display device of claim 7, wherein the second afterimage calculation equation f2(x) is defined by one of following Equations:

$$f2(x)=Rb+cx+d,$$

$$f2(x)=cx+d, \text{ and}$$

$$f2(x)=ce^{dx},$$

where Rb denotes a ratio obtained by dividing a luminance of the target image by a self-luminance, and each of c and d is a constant.

10. The display device of claim 9, wherein the compensation value has a value equal or substantially equal to a reciprocal of the final afterimage component with respect to Rb.

11. The display device of claim 1, wherein the final afterimage component has a positive value when the still image has a grayscale lower than a grayscale of the target image and has a negative value when the grayscale of the still image is higher than the grayscale of the target image.

12. A display device comprising:

a display panel comprising a first display area and a second display area, and which displays a first image through the first and second display areas in a first mode, and displays a second image through the first display area in a second mode;

a panel driver, which drives the display panel in the first mode or the second mode; and a driving controller, which controls a drive of the panel driver, the driving controller comprising:

a compensation determination block, which is activated after the second mode is switched to the first mode and generates a compensation value based on a final afterimage component calculated using an afterimage algorithm obtained by a combination of a first afterimage calculation equation and a second afterimage calculation equation; and a data compensation block, which receives a second image signal corresponding to the second display area and reflects the compensation value to the second image signal to generate a second compensation image signal, wherein the afterimage algorithm is defined by following Equation:

$$f(x)=f1(x)+f2(x),$$

where f1(x) denotes the afterimage algorithm, f1(x) denotes the first afterimage calculation equation, and f2(x) denotes the second afterimage calculation equation, wherein the first afterimage calculation equation f1(x) is defined by following Equation:

$$f1(x)=ae^{bx},$$

the second afterimage calculation equation f2(x) is defined by one of following Equations:

$$f2(x)=Rb+cx+d,$$

$$f2(x)=cx+d, \text{ and}$$

$$f2(x)=ce^{dx},$$

where Rb denotes a ratio obtained by dividing a luminance of the target image by a self-luminance, and each of a, b, c and d is a constant.

13. The display device of claim 12, wherein a predetermined reference image is displayed through the second display area in the second mode, and the compensation determination block generates the first and second afterimage calculation equations by reflecting a difference in grayscale between the reference image and a target image and a time during which the reference image is displayed, and the target image corresponds to an original image of the second image signal without an afterimage.

14. The display device of claim 13, wherein the compensation determination block comprises:

an image determination block, which compares a previous image signal with the second image signal to generate a variation amount and compares the variation amount with a predetermined reference value to determine whether the first image displayed on the second display area is changed and to output a state signal as a result of a determination; and a compensation value generation block, which receives the variation amount and the determined result to generate the afterimage algorithm and outputs the compensation value using the afterimage algorithm.

15. The display device of claim 14, wherein the compensation value generation block comprises:

a state accumulator, which receives and accumulates the state signal from the image determination block when the variation amount is equal to the reference value and outputs an accumulated result of the state signal in units of a predetermined reference time;

an afterimage component determiner, which generates the afterimage algorithm based on the variation amount and the accumulated result and calculates the final afterimage component using the afterimage algorithm; and a compensation value determiner, which generates the compensation value based on the final afterimage component.

16. The display device of claim 15, wherein the compensation value determiner updates the compensation value in units of a first compensation interval during a first period and updates the compensation value in units of a second compensation interval during a second period, and the first compensation interval is smaller than the second compensation interval.

17. The display device of claim 12, wherein the compensation determination block is deactivated in the second mode and is activated from a time point at which the first mode starts after the second mode.

* * * * *